US008743479B2

(12) United States Patent
Tsai et al.

(10) Patent No.: US 8,743,479 B2
(45) Date of Patent: Jun. 3, 2014

(54) IMAGE CAPTURING OPTICAL LENS ASSEMBLY

(75) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 138 days.

(21) Appl. No.: 13/612,858

(22) Filed: Sep. 13, 2012

(65) Prior Publication Data

US 2013/0201567 A1 Aug. 8, 2013

(30) Foreign Application Priority Data

Feb. 8, 2012 (TW) ............................. 101104098 A

(51) Int. Cl.
*G02B 3/02* (2006.01)
*G02B 9/08* (2006.01)
*G02B 9/60* (2006.01)

(52) U.S. Cl.
USPC ........... 359/714; 359/739; 359/740; 359/763; 359/764

(58) Field of Classification Search
USPC ......................... 359/714, 739, 740, 763, 764
See application file for complete search history.

(56) References Cited

U.S. PATENT DOCUMENTS

| 7,869,142 | B2 | 1/2011 | Chen et al. | |
|---|---|---|---|---|
| 7,911,711 | B1 | 3/2011 | Tang et al. | |
| 8,441,743 | B2* | 5/2013 | Ohtsu | 359/714 |
| 8,675,289 | B2* | 3/2014 | Tsai et al. | 359/714 |
| 2011/0188131 | A1* | 8/2011 | Sano | 359/714 |
| 2012/0087019 | A1* | 4/2012 | Tang et al. | 359/714 |
| 2013/0010374 | A1* | 1/2013 | Hsieh et al. | 359/714 |
| 2013/0182336 | A1* | 7/2013 | HSU et al. | 359/714 |
| 2013/0188263 | A1* | 7/2013 | TSAI et al. | 359/714 |

* cited by examiner

Primary Examiner — Evelyn A. Lester
(74) Attorney, Agent, or Firm — CKC & Partners Co., Ltd.

(57) ABSTRACT

An image capturing optical lens assembly includes, in order from an object side to an image side, a first lens element, a second lens element, a third lens element, a fourth lens element and a fifth lens element. The first lens element with positive refractive power has a convex object-side surface. The second lens element with negative refractive power has a concave image-side surface. The third lens element with positive refractive power has a convex image-side surface. The fourth lens element has positive refractive power. The fifth lens element with refractive power is made of plastic material and has a concave image-side surface. At least one inflection point is formed on at least one of the object-side and image-side surfaces of the fifth lens element. The surfaces of the third lens element, the fourth lens element and the fifth lens element are aspheric.

26 Claims, 20 Drawing Sheets

IMAGE CAPTURING OPTICAL LENS ASSEMBLY

RELATED APPLICATIONS

The application claims priority to Taiwan Application Serial Number 101104098, filed Feb. 8, 2012, which is herein incorporated by reference.

BACKGROUND

1. Technical Field

The present disclosure relates to an image capturing optical lens assembly. More particularly, the present disclosure relates to an image capturing optical lens assembly that applicable to 2D or 3D image-capturing capability on electronic device.

2. Description of Related Art

In recent years, with the popularity of mobile products with camera functionalities, the demand for miniaturizing an optical lens assembly is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact optical lens assemblies have gradually evolved toward the field of higher megapixels, there is an increasing demand for optical lens assemblies featuring better image quality.

A conventional compact optical lens assembly employed in a portable electronic product mainly adopts a four-element lens structure. Due to the popularity of mobile products with high-end specifications, such as smart phones and PDAs (Personal Digital Assistants), the pixel and image-quality requirements of the compact optical lens assembly have increased rapidly. However, the conventional four-element lens structure cannot satisfy the requirements of the compact optical lens assembly.

Another conventional optical lens assembly with five-element lens structure has better image quality and higher resolution. However, the sensitivity of the optical lens assembly with five-element lens structure would become more pronounced due to unbalanced distribution of the positive refractive power between the first lens element and the third lens element of the optical lens assembly. Thus, the fabrication yield of the optical lens assembly is lowered due to the higher sensitivity in the construction of an optical system.

Therefore, a need exists in the art for providing an optical lens assembly that has excellent imaging quality and high fabrication yield.

SUMMARY

According to one aspect of the present disclosure, an image capturing optical lens assembly includes, in order from an object side to an image side, a first lens element, a second lens element, a third lens element, a fourth lens element and a fifth lens element. The first lens element with positive refractive power has a convex object-side surface. The second lens element with negative refractive power has a concave image-side surface. The third lens element with positive refractive power has a convex image-side surface, wherein an object-side surface and the image-side surface of the third lens element are aspheric. The fourth lens element with positive refractive power, wherein an object-side surface and an image-side surface of the fourth lens element are aspheric. The fifth lens element with refractive power made of plastic material and has a concave image-side surface, wherein an object-side surface and the image-side surface of the fifth lens element are aspheric, and the fifth lens element has at least one inflection point formed on at least one of the object-side surface and the image-side surface thereof. When a focal length of the image capturing optical lens assembly is f, a focal length of the first lens element is f1, a focal length of the third lens element is f3, a curvature radius of the image-side surface of the second lens element is R4, a curvature radius of the image-side surface of the third lens element is R6, an axial distance between the second lens element and the third lens element is T23, and a central thickness of the fifth lens element is CT5, the following relationships are satisfied:

$$0<(f/f3)-(f/f1)<0.85;$$

$$0<R4/f<3.0;$$

$$-4.5<R6/f<0; \text{ and}$$

$$0<T23/CT5<0.70.$$

According to another aspect of the present disclosure, an image capturing optical lens assembly includes, in order from an object side to an image side, a first lens element, a second lens element, a third lens element, a fourth lens element and a fifth lens element. The first lens element with positive refractive power has a convex object-side surface. The second lens element with negative refractive power has a concave image-side surface. The third lens element with positive refractive power, wherein an object-side surface and an image-side surface of the third lens element are aspheric. The fourth lens element with positive refractive power, wherein an object-side surface and an image-side surface of the fourth lens element are aspheric. The fifth lens element with refractive power made of plastic material and has a concave image-side surface, wherein an object-side surface and the image-side surface of the fifth lens element are aspheric, and the fifth lens element has at least one inflection point formed on at least one of the object-side surface and the image-side surface thereof. When a focal length of the image capturing optical lens assembly is f, a focal length of the first lens element is f1, a focal length of the third lens element is f3, a focal length of the fourth lens element is to f4, a curvature radius of the image-side surface of the second lens element is R4, an axial distance between the second lens element and the third lens element is T23, and a central thickness of the fifth lens element is CT5, the following relationships are satisfied:

$$-0.25<(f/f3)-(f/f1)<1.0;$$

$$0<R4/f<3.0;$$

$$0<T23/CT5<0.70; \text{ and}$$

$$0<f/f4<0.90.$$

According to still another aspect of the present disclosure, an image capturing optical lens assembly includes, in order from an object side to an image side, a first lens element, a second lens element, a third lens element, a fourth lens element and a fifth lens element. The first lens element with positive refractive power has a convex object-side surface. The second lens element with negative refractive power has a concave image-side surface. The third lens element with positive refractive power has a convex image-side surface, wherein an object-side surface and the image-side surface of the third lens element are aspheric. The fourth lens element with positive refractive power has a concave object-side surface and a convex image-side surface, wherein the object-side surface and the image-side surface of the fourth lens element are aspheric. The fifth lens element with refractive power made of plastic material and has a concave image-side surface, wherein an object-side surface and the image-side surface of the fifth lens element are aspheric, and the fifth lens element has at least one inflection point formed on at least one of the object-side surface and the image-side surface thereof. When a focal length of the image capturing optical lens assembly is f, a focal length of the first lens element is f1, a focal length of the third lens element is f3, a curvature radius of the image-side surface of the second lens element is R4, an axial distance between the second lens element and the third lens element is T23, and an axial distance between the third lens element and the fourth lens element is T34, the following relationships are satisfied:

$0<(f/f3)-(f/f1)<0.85;$ $0<R4/f<3.0;$ and $0<T23/T34<1.0.$

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
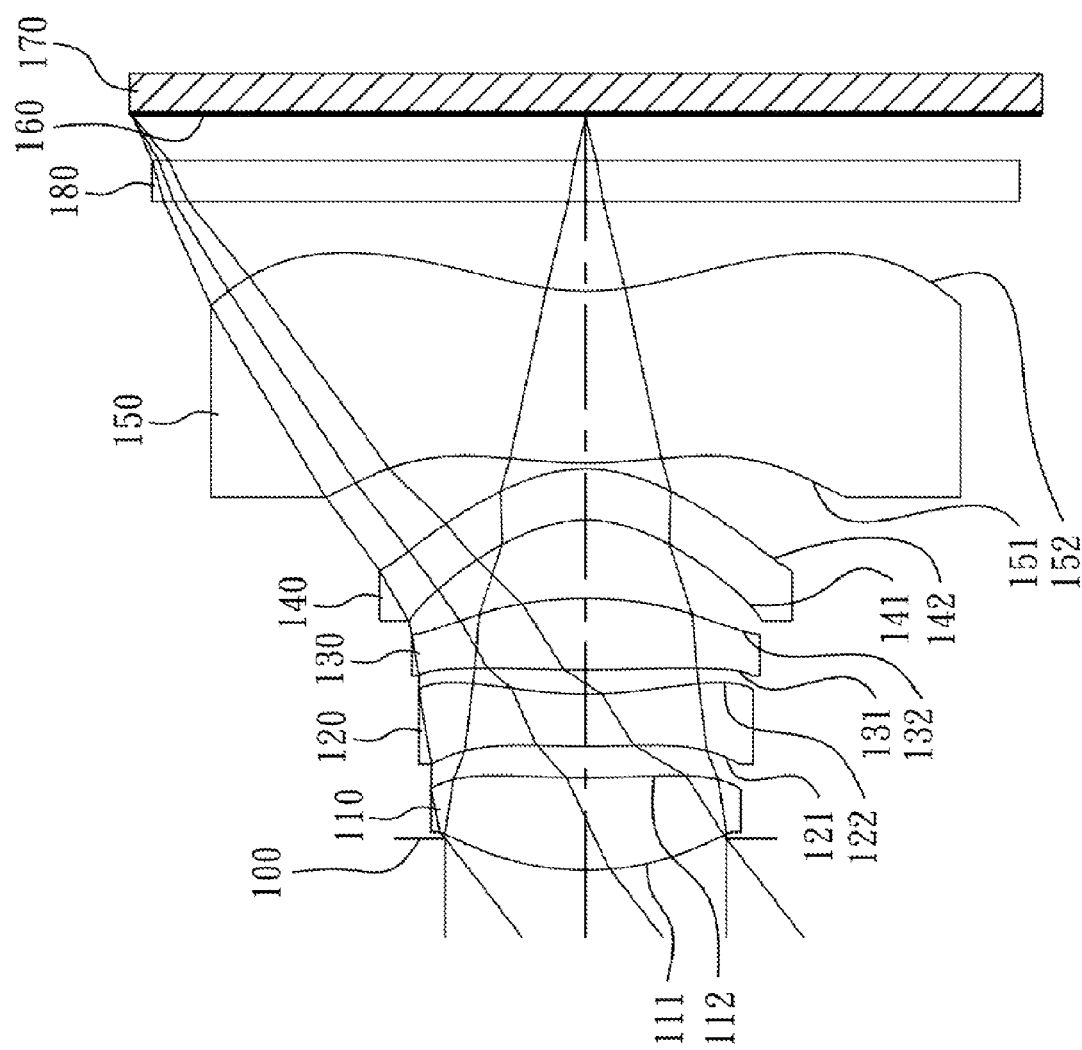
FIG. 1 is a schematic view of an image capturing optical lens assembly according to the 1st embodiment of the present disclosure.

An image capturing optical lens assembly includes, in order from an object side to an image side, a first lens element, a second lens element, a third lens element, a fourth lens element and a fifth lens element. The image capturing optical lens assembly further includes an image sensor located on an image plane.

The first lens element with positive refractive power has a convex object-side surface for enhancing the positive refractive power of the first lens element, so that the total track length of the image capturing optical lens assembly can be reduced so as to maintain the compact size thereof.

The second lens element with negative refractive power can correct the aberration generated from the first lens element with positive refractive power. The second lens element can have a concave mage-side surface, so that the refractive power of the second lens element can be adjusted by the curvature of the concave image-side surface of the second lens element, thus the aberration of the image capturing optical lens assembly can be corrected.

The third lens element has positive refractive power, so that the spherical aberration generated from the first lens element can be reduced. In addition, by distributing the positive refractive power of the first lens element, the sensitivity of the image capturing optical lens assembly can also be reduced. When the third lens element has a convex image-side surface the strength of the positive refractive power of the third lens element can be further enhanced.

The fourth lens element with positive refractive power can provide a partial distribution of the refractive power of the image capturing optical lens assembly, so that the aberration of the image capturing optical lens assembly can be adjusted for increasing the image quality. The fourth lens element has a concave object-side surface and a convex image-side surface, so that the astigmatism of the image capturing optical lens assembly can be corrected.

The fifth lens element with negative refractive power may have a convex object-side surface and a concave image-side surface. Therefore, a principal point of the image capturing optical lens assembly can be positioned away from the image plane, and the total track length of the image capturing optical lens assembly can be reduced so as to maintain the compact size thereof. The convex object-side surface and a concave image-side surface of the fifth lens element can also correct the astigmatism of the image capturing optical lens assembly for increasing the image quality. Furthermore, the fifth lens element has at least one inflection point formed on at least one of the object-side surface and the image-side surface thereof, so that the incident angle of the off-axis field on the image sensor can be effectively minimized and the aberration can be corrected as well.

When a focal length of the image capturing optical lens assembly is f, a focal length of the first lens element is f1, and a focal length of the third lens element is f3, the following relationship is satisfied: $-0.25<(f/f3)-(f/f1)$ Therefore, the positive refractive power of the third lens element can balance the positive refractive power of the first lens element. In addition, the spherical aberration of the first lens element can be reduced and the manufacture yield of the image capturing optical lens assembly would likely increase by reducing the sensitivity thereof. f, f1, and f3 can preferably also satisfy the following relationship: $0<(f/f3)-(f/f1)<0.85$.

When the focal length of the image capturing optical lens assembly is f, and a curvature radius of the image-side surface of the second lens element is R4, the following relationship is satisfied: $0<R4/f<3.0$. Therefore, the aberration of the image capturing optical lens assembly can be corrected by properly adjusting the curvature of the second lens element. R4 and f can preferably also satisfy the following relationship: $0<R4/f<1.0$.

When the focal length of the image capturing optical lens assembly is f, and a curvature radius of the image-side surface of the third lens element is R6, the following relationship is satisfied: $-4.5\ R6/f<0$. Therefore, the positive refractive power of the third lens element can be adjusted by the proper curvature of the image-side surface thereof. In addition, the sensitivity of the image capturing optical lens assembly can be reduced. R6 and f can preferably also satisfy the following relationship: $-1.0<R6/f<0$.

When an axial distance between the second lens element and the third lens element is T23, and a central thickness of the fifth lens element is CT5, the following relationship is satisfied: $0<T23/CT5<0.70$. Therefore, the fabrication of the image capturing optical lens assembly is easy due to properly adjusting the distance between the lens elements and the thickness of the lens element.

When the focal length of the image capturing optical lens assembly is f, and a focal length of the fourth lens element is f4, the following relationship is satisfied: $0<f/f4<0.90$. Therefore, the aberration of the image capturing optical lens assembly can be reduced by properly adjusting the positive refractive power of the fourth lens element. f and f4 can preferably also satisfy the following relationship: $0<f/f4<0.45$.

When the focal length of the image capturing optical lens assembly is f, and a focal length of the third lens element is f3, the following relationship is satisfied: $0.7<f/f3<1.7$. Therefore, the sensitivity of the image capturing optical lens assembly can be reduced by properly adjusting the positive refractive power of the third lens element.

When a central thickness of the second lens element is CT2, a central thickness of the third lens element is CT3, a central thickness of the fourth lens element is CT4, and the central thickness of the fifth lens element is CT5, the following relationship is satisfied: $0.5<CT5/(CT2+CT3+CT4)<1.5$. Therefore, the fabrication of the image capturing optical lens assembly is simpler due to the proper adjustment of the thickness of the lens element.

When an Abbe number of the fourth lens element is V4, an Abbe number of the fifth lens element is V5, an Abbe number of the first lens element is V1 and an Abbe number of the second lens element is V2, the following relationships are satisfied: $10<V5-V4<45$; and $28<V1-V2<50$. Therefore, the chromatic aberration of the image capturing optical lens assembly can be corrected.

When a curvature radius of the object-side surface of the fourth lens element is R7, and a curvature radius of the image-side surface of the fourth lens element is R8, the following relationship is satisfied: $-0.2\ (R7-R8)/(R7+R8)<-0.2$. Therefore the surface curvature of the fourth lens element can correct the aberration for increasing the image quality thereof.

When the central thickness of the fourth lens element is CT4, and the central thickness of the fifth lens element is CT5, the following relationship is satisfied: $0.25<CT4/CT5<07$. Therefore, the fabrication of the image capturing optical lens assembly is simpler due to favorable values for the thicknesses of the fourth lens element and the fifth lens element.

When an axial distance between the object-side surface of the first lens element and the image plane is TTL, and a maximum image height of the image capturing optical lens assembly is ImgH, the following relationship is satisfied: $TTL/ImgH<1.8$. Therefore, the total track length of the image capturing optical lens assembly can be reduced so as to maintain the compact size of the image capturing optical lens assembly for portable electronic products.

When an axial distance between the first lens element and the second lens element is T12, and an axial distance between the third lens element and the fourth lens element is T34, the following relationship is satisfied: $0.1<T12/T34<0.7$. Therefore, the total track length of the image capturing optical lens assembly can be reduced by properly adjusting the distances between individual lens elements among all lens elements of the image capturing optical lens assembly. Thus, the image capturing optical lens assembly is suitable for a compact electronic device.

When an axial distance between the second lens element and the third lens element is T23, the axial distance between the third lens element and the fourth lens element is T34, the following relationship is satisfied: $0<T23/T34<1.0$. Therefore, the total track length of the image capturing optical lens assembly can be reduced by properly adjusting the distances between individual lens elements among all lens elements of the image capturing optical lens assembly. Thus, the image capturing optical lens assembly is suitable for a compact electronic device.

According to the image capturing optical lens assembly of the present disclosure, the lens elements thereof can be made of plastic material or glass. When the lens elements are made of glass material, the allocation of the refractive power of the image capturing optical lens assembly may be more flexible and easier to design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, and the number of required lens elements can be reduced while constructing an optical system. Therefore, the total track length of the image capturing optical lens assembly can also be reduced.

According to the image capturing optical lens assembly of the present disclosure, when the lens element has a convex surface, it indicates that the paraxial region of the surface is convex; and when the lens element has a concave surface, it indicates that the paraxial region of the surface is concave.

According to the image capturing optical lens assembly of the present disclosure, the image capturing optical lens assembly can include at least one stop, such as a glare stop or a field stop, for educing stray light while retaining high image quality. Furthermore, when a stop is an aperture stop, the position of the aperture stop within an optical system can be arbitrarily placed in front of the entire lens assembly, within the lens assembly, or in front of the image plane in accordance with the preference of the optical designer, in order to achieve the desirable optical features or higher image quality produced from the optical system.

According to the above description of the present disclosure, the following 1st 10th specific embodiments are provided for further explanation.

1st Embodiment

Figure 2:
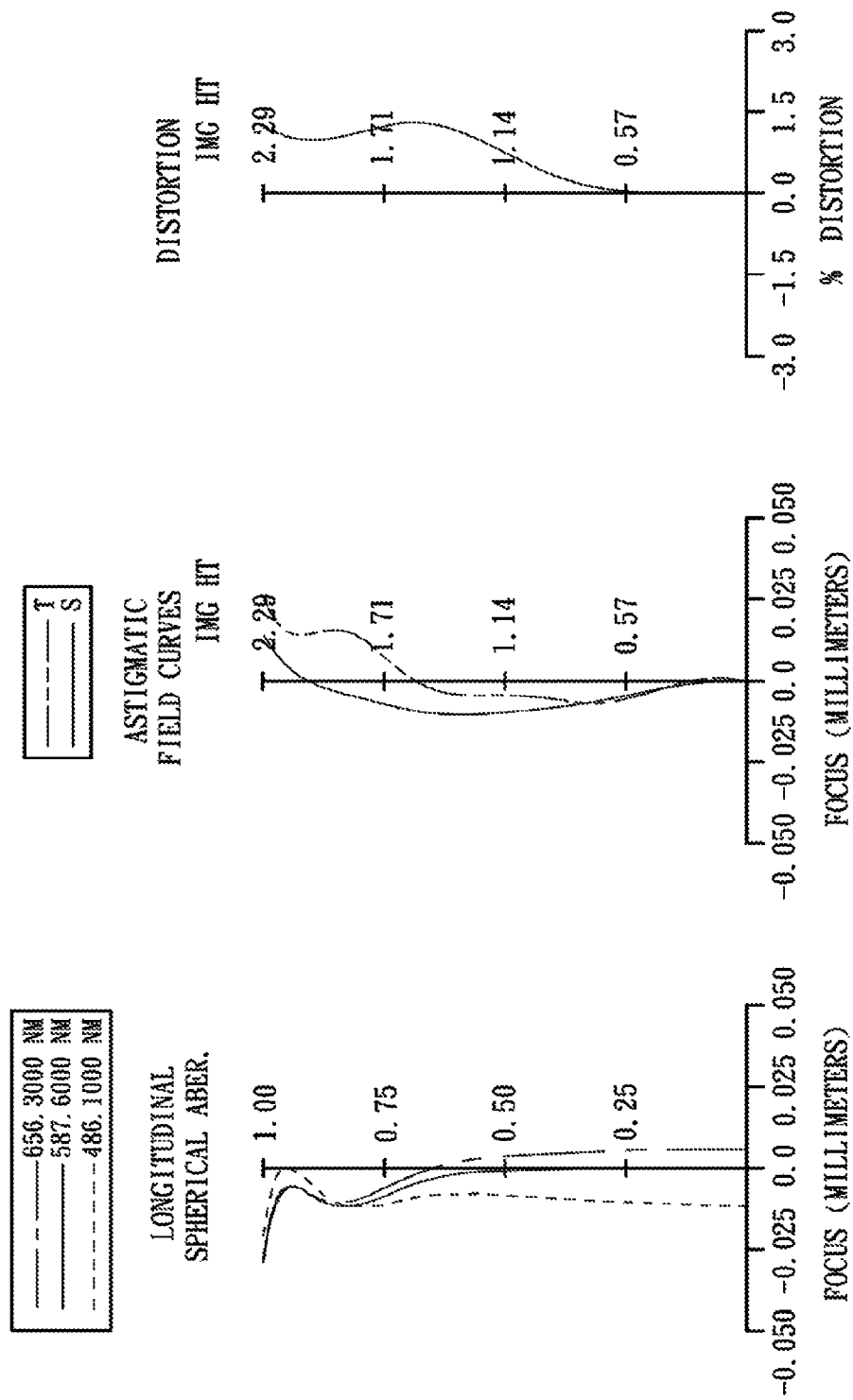
FIG. 2 shows spherical aberration curves, astigmatic field curves and a distortion curve of the image capturing optical lens assembly according to the 1st Embodiment.

FIG. 1 is a schematic view of an image capturing optical lens assembly according to the 1st embodiment of the present disclosure. FIG. 2 shows spherical aberration curves, astigmatic field curves and a distortion curve of the image capturing optical lens assembly according to the 1st embodiment. FIG. 1, the image capturing optical lens assembly includes, in order from an to object side to an image side, an aperture stop 100, the first lens element 110, the second lens element 120, the third lens element 130, the fourth lens element 140, the fifth lens element 150, an IR-cut filter 180, an image plane 160 and an image sensor 170.

The first lens element 110 with positive refractive power has a convex object-side surface 111 and a concave image-side surface 112. It is made of plastic material with the object-side surface 111 and the image-side surface 112 being aspheric.

The second lens element 120 with negative refractive power has a convex object-side surface 121 and a concave image-side surface 122. It is made of plastic material with the object-side surface 121 and the image-side surface 122 being aspheric.

The third lens element 130 with positive refractive power has a convex object-side surface 131 and a convex image-side surface 132. It is made of plastic material with the object-side surface 131 and the image-side surface 132 being aspheric.

The fourth lens element 140 with positive refractive power has a concave object-side surface 141 and a convex image-side surface 142. It is made of plastic material with the object-side surface 141 and the image-side surface 142 being aspheric.

The fifth lens element 150 with negative refractive power has a convex object-side surface 151 and a concave image-side surface 152. It is made of plastic material with the object-side surface 151 and the image-side surface 152 being aspheric. Furthermore, the fifth lens element 150 has inflection points formed on the object-side surface 151 and the image-side surface 152 thereof.

The IR-cut filter 180 is made of glass material, wherein the IR-cut filter 180 is located between the fifth lens element 150 and the image plane 160, and will not affect the focal length of the image capturing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing optical lens assembly according to the 1st embodiment, when a focal length of the image capturing optical lens assembly is f, an f-number of the image capturing optical lens assembly is Fno, and half of the maximal field of view is HFOV, these parameters have the following values:

$f=2.92$ mm;

$Fno=2.07$; and $HFOV=37.7$ degrees.

In the image capturing optical lens assembly according to the 1st embodiment, when an Abbe number of the first lens element 110 is V1, an Abbe number of the second lens element 120 is V2, an Abbe number of the fourth lens element 140 is V4, and an Abbe number of the fifth lens element 150 is V5, the following relationships are satisfied:

$V1-V2=32.6$; and $V5-V4=32.6$.

In the image capturing optical lens assembly according to the 1st embodiment, when a central thickness of the second lens element 120 is CT2, a central thickness of the third lens element 130 is CT3, a central thickness of the fourth lens element 140 is CT4, and a central thickness of the fifth lens element 150 is CT5, the following relationships are satisfied:

$CT4/CT5=0.30$; and $CT5/(CT2+CT3+CT4)=0.97$.

In the image capturing optical lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, and the central thickness of the fifth lens element 150 is CT5, the following relationships are satisfied:

$T12/T34=0.40$;

$T23/CT5=0.14$; and $T23/T34=0.31$.

In the image capturing optical lens assembly according to the 1st embodiment, when the focal length of the image capturing optical lens assembly is f, a curvature radius of the image-side surface 122 of the second lens element 120 is R4, and a curvature radius of the image-side surface 132 of the third lens element 130 is R6, the following relationships are satisfied:

$R4/f=0.61$; and $R6/f=-0.70$.

In the image capturing optical lens assembly according to the 1st embodiment, when a curvature radius of the object-side surface 141 of the fourth lens element 140 is R7, and a curvature radius of the image-side surface 142 of the fourth lens element 140 is R8, the following relationship is satisfied:

$(R7-R8)/(R7+R8)=-0.07$.

In the image capturing optical lens assembly according to the 1st embodiment, when the focal length of the image capturing optical lens assembly is f, a focal length of the first lens element 110 is f1, a focal length of the third lens element 130 is f3, and a focal length of the fourth lens element 140 is f4, the following relationships are satisfied:

$$(f/f3)-(f/f1)=0.11;$$

$$f/f3=1.03; \text{ and}$$

$$f/f4=0.03.$$

In the image capturing optical lens assembly according to the 1st embodiment, when an axial distance between the object-side surface 111 of the first lens element 110 and the image plane 160 is TTL, and a maximum image height of the image capturing optical lens assembly is ImgH which here is a half of the diagonal length of the photosensitive area of the image sensor 170 on the image plane 160, the following relationship is satisfied:

$$TTL/ImgH=1.63.$$

The detailed optical data of the 1st embodiment are shown in Table 1 to and the aspheric surface data are shown in Table 2 below.

TABLE 1

1st Embodiment
f = 2.92 mm, Fno = 2.07, HFOV = 37.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.161 | | | | |
| 2 | Lens 1 | 1.374400 (ASP) | 0.464 | Plastic | 1.544 | 55.9 | 3.18 |
| 3 | | 5.853200 (ASP) | 0.158 | | | | |
| 4 | Lens 2 | 4.743500 (ASP) | 0.261 | Plastic | 1.640 | 23.3 | −4.62 |
| 5 | | 1.782490 (ASP) | 0.122 | | | | |
| 6 | Lens 3 | 5.882400 (ASP) | 0.361 | Plastic | 1.544 | 55.9 | 2.84 |
| 7 | | −2.054590 (ASP) | 0.391 | | | | |
| 8 | Lens 4 | −0.641270 (ASP) | 0.260 | Plastic | 1.640 | 23.3 | 85.12 |
| 9 | | −0.734070 (ASP) | 0.030 | | | | |
| 10 | Lens 5 | 2.569120 (ASP) | 0.859 | Plastic | 1.544 | 55.9 | −5.32 |
| 11 | | 1.201270 (ASP) | 0.450 | | | | |
| 12 | IR-cut filter | Plano | 0.210 | Glass | 1.517 | 64.2 | — |
| 13 | | Plano | 0.232 | | | | |
| 14 | Image | Plano | — | | | | |

Note:
Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | −1.49555E−01 | −4.42989E+01 | −9.00000E+01 | −1.69855E+01 | −8.42730E+01 |
| A4 = | 1.32512E−04 | −1.91262E−01 | −5.13064E−01 | −2.35981E−01 | −2.03710E−01 |
| A6 = | −2.44636E−02 | 1.49903E−01 | 7.48926E−01 | 4.09411E−01 | 4.46434E−02 |
| A8 = | −1.27608E−01 | −5.10344E−01 | −1.69686E+00 | −5.43256E−01 | 6.11451E−01 |
| A10 = | 5.65802E−01 | 6.85187E−02 | 1.38612E+00 | 5.98910E−02 | −4.49769E−01 |
| A12 = | −1.10184E+00 | 2.45857E−02 | −4.66058E−02 | −3.73841E−02 | −1.70491E+00 |
| A14 = | 8.55185E−02 | −1.22676E−01 | 7.84949E−02 | 1.52831E−02 | 2.94968E+00 |
| A16 = | | | | | −1.81800E+00 |

| | Surface # | | | | |
|---|---|---|---|---|---|
| | 8 | 9 | 10 | 11 | 12 |
| k = | 1.89120E+00 | −2.13349E+00 | −7.52379E−01 | −1.98544E+01 | −8.17167E+00 |
| A4 = | −9.07443E−02 | 1.25120E−01 | 4.56169E−01 | −2.21279E−01 | −8.73051E−02 |
| A6 = | −1.07134E−02 | −7.67196E−01 | −3.65011E−01 | 9.55529E−02 | 4.25371E−02 |
| A8 = | 1.01352E−01 | 1.35179E+00 | 1.39088E−01 | −5.64878E−02 | −2.14441E−02 |
| A10 = | 6.26683E−01 | −1.12860E+00 | 2.13674E−01 | 1.32117E−02 | 6.00775E−03 |
| A12 = | −5.25303E−01 | 1.89653E−01 | −1.26557E−01 | 6.48854E−03 | −9.35469E−04 |
| A14 = | −2.83769E−05 | 4.02431E−01 | −1.60616E−01 | −4.18070E−04 | 6.41044E−05 |
| A16 = | | −4.23905E−01 | 1.33108E−01 | −7.12079E−04 | |

In Table 1, the curvature radius, the thickness and the focal length are shown in millimeters (mm). Surface numbers 0-14 represent the surfaces sequentially arranged from the object-side to the mage-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
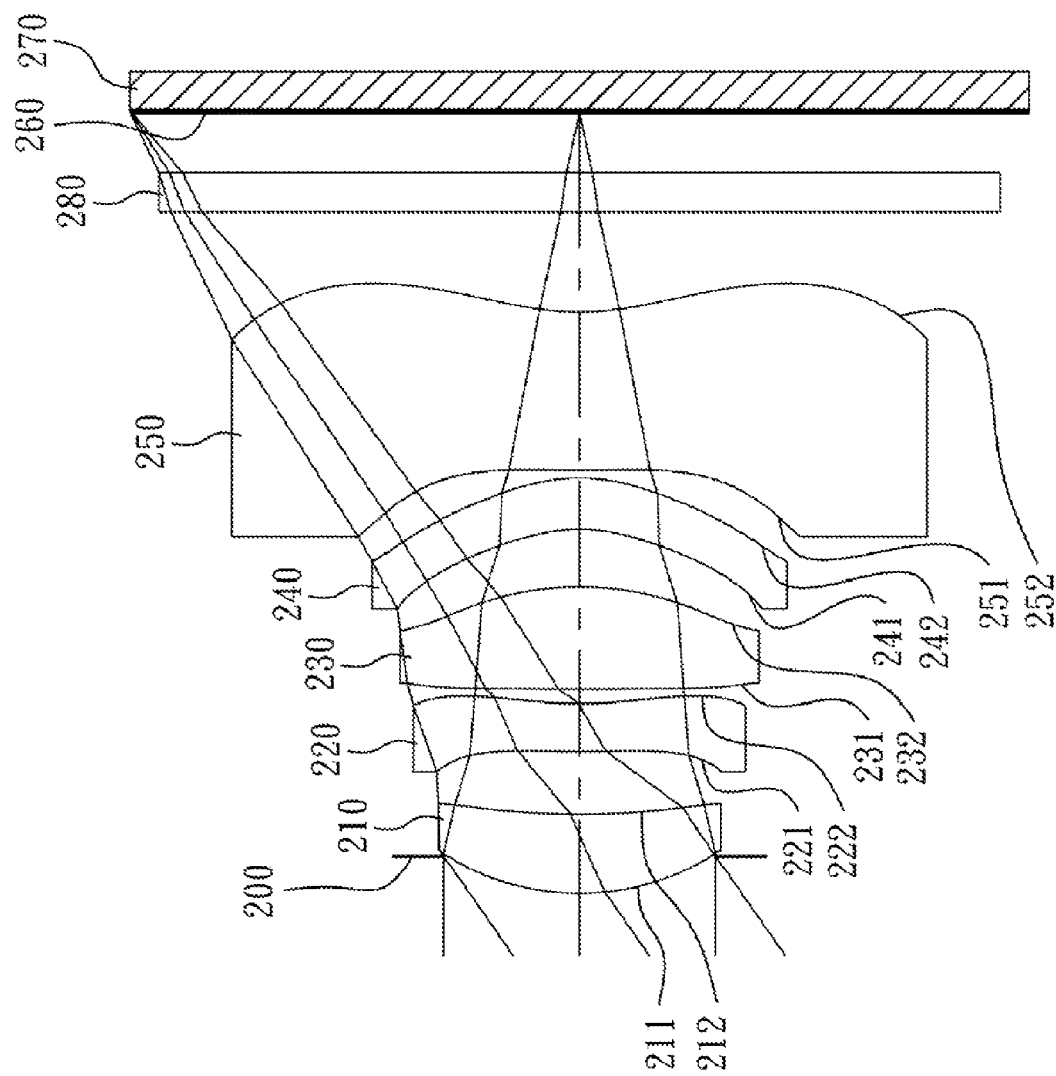
FIG. 3 is a schematic view of an image capturing optical lens assembly according to the 2nd embodiment of the present disclosure.
Figure 4:
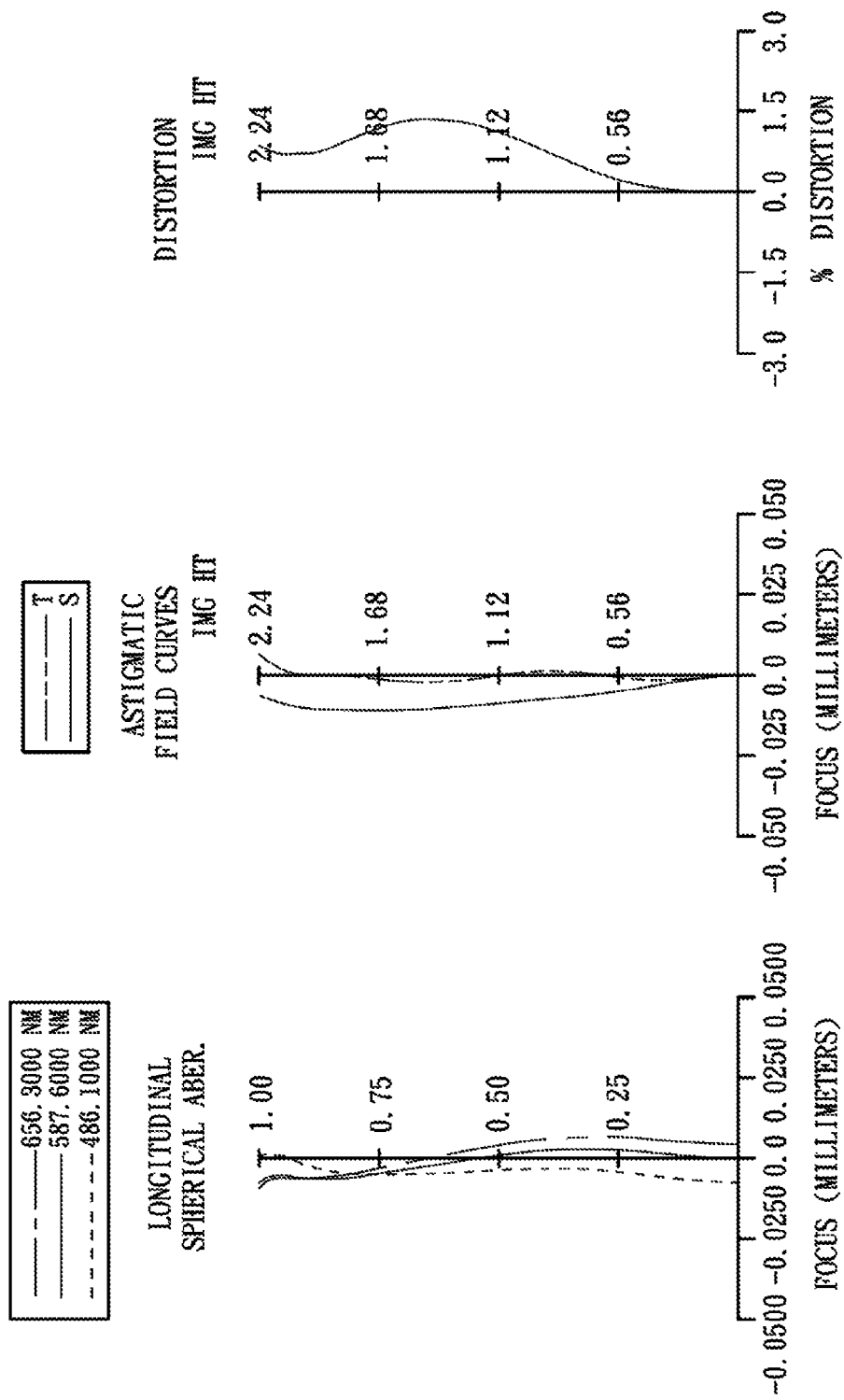
FIG. 4 shows spherical aberration curves, astigmatic field curves and a distortion curve of the image capturing optical lens assembly according to the 2nd Embodiment.

FIG. 3 is a schematic view of an image capturing optical lens assembly according to the 2nd embodiment of the present disclosure. FIG. 4 shows spherical aberration curves, astigmatic field curves and a distortion curve of the image capturing optical lens assembly according to the 2nd embodiment. In FIG. 3, the image capturing optical lens assembly includes, in order from an object side to an image side, an aperture stop 200, the first lens element 210, the second lens element 220, the third lens element 230, the fourth lens element 240, the fifth lens element 250, an IR-cut filter 280, an image plane 260 and an image sensor 270.

The first lens element 210 with positive refractive power has a convex object-side surface 211 and a concave image-side surface 212. It is made of glass material with the object-side surface 211 and the image-side surface 212 being aspheric.

The second lens element 220 with negative refractive power has a convex object-side surface 221 and a concave image-side surface 222. It is made of plastic material with the object-side surface 221 and the image-side surface 222 being aspheric.

The third lens element 230 with positive refractive power has a convex object-side surface 231 and a convex image-side surface 232. It is made of plastic material with the object-side surface 231 and the image-side surface 232 being aspheric.

The fourth lens element 240 with positive refractive power has a concave object-side surface 241 and a convex image-side surface 242. It is made of plastic material with the object-side surface 241 and the image-side surface 242 being aspheric.

The fifth lens element 250 with negative refractive power has a convex object-side surface 251 and a concave image-side surface 252. It is made of plastic material with the object-side surface 251 and the image-side surface 252 being aspheric. Furthermore, the fifth lens element 250 has inflection points formed on the object-side surface 251 and the image-side surface 252 thereof.

The IR-cut filter 280 is made of glass material, wherein the IR-cut filter 280 is located between the fifth lens element 250 and the image plane 260, and will not affect the focal length of the image capturing optical lens assembly.

The detailed optical data of the 2nd embodiment are shown in Table 3 and the aspheric surface data are shown in Table 4 below.

TABLE 3

2nd Embodiment
f = 3.19 mm, Fno = 2.35, HFOV = 34.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.188 | | | | |
| 2 | Lens 1 | 1.277730 (ASP) | 0.395 | Glass | 1.569 | 71.3 | 3.19 |
| 3 | | 3.836100 (ASP) | 0.313 | | | | |
| 4 | Lens 2 | 7.547200 (ASP) | 0.241 | Plastic | 1.640 | 23.3 | −5.04 |
| 5 | | 2.232270 (ASP) | 0.070 | | | | |
| 6 | Lens 3 | 15.144500 (ASP) | 0.513 | Plastic | 1.535 | 56.3 | 2.69 |
| 7 | | −1.571470 (ASP) | 0.284 | | | | |
| 8 | Lens 4 | −0.871220 (ASP) | 0.260 | Plastic | 1.640 | 23.3 | 13.63 |
| 9 | | −0.884340 (ASP) | 0.038 | | | | |
| 10 | Lens 5 | 9.955900 (ASP) | 0.787 | Plastic | 1.535 | 56.3 | −2.78 |
| 11 | | 1.257040 (ASP) | 0.500 | | | | |
| 12 | IR-cut filter | Plano | 0.200 | Glass | 1.517 | 64.2 | — |
| 13 | | Plano | 0.301 | | | | |
| 14 | Image | Plano | — | | | | |

Note:
Reference wavelength (d-line) is 587.6 nm.

TABLE 4

Aspheric Coefficients

| | Surface # | | | | |
|---|---|---|---|---|---|
| | 2 | 3 | 4 | 5 | 6 |
| k = | 7.90471E−02 | −1.00000E+00 | 1.53756E+00 | −4.68073E+00 | 3.00000E+00 |
| A4 = | 1.12475E−02 | −2.09222E−02 | −4.46192E−01 | −3.64959E−01 | −1.17083E−01 |
| A6 = | 7.19942E−02 | 5.55385E−02 | 2.19461E−01 | 2.85860E−01 | 6.91015E−02 |
| A8 = | −2.20670E−01 | −2.35930E−01 | −1.16058E+00 | −4.17818E−01 | 5.31437E−01 |
| A10 = | 6.06383E−01 | 2.09463E−01 | 1.30100E+00 | 1.43313E−01 | −2.90983E−01 |
| A12 = | −5.99589E−01 | 2.86046E−01 | 1.39589E−02 | 8.59301E−02 | −1.70702E+00 |
| A14 = | 2.47180E−02 | −1.35362E+00 | −2.03336E+00 | −6.91974E−02 | 3.07517E+00 |
| A16 = | | | | | −1.62961E+00 |

TABLE 4-continued

Aspheric Coefficients

| | Surface # | | | | |
|---|---|---|---|---|---|
| | 7 | 8 | 9 | 10 | 11 |
| k = | 7.74462E−01 | −1.69321E+00 | −7.07472E−01 | −8.97299E−01 | −9.27057E+00 |
| A4 = | −2.59135E−02 | 4.28995E−01 | 4.97011E−01 | −3.68817E−01 | −1.20011E−01 |
| A6 = | 4.76826E−02 | −9.08329E−01 | −4.83916E−01 | 1.17850E−01 | 5.45345E−02 |
| A8 = | 7.18804E−02 | 1.08198E+00 | 1.73467E−01 | −8.48597E−02 | −2.49726E−02 |
| A10 = | 5.28158E−01 | −8.47266E−01 | 1.68004E−01 | 4.35395E−02 | 6.79218E−03 |
| A12 = | −6.29406E−01 | 2.26229E−01 | −1.05813E−01 | 1.17419E−03 | −1.06902E−03 |
| A14 = | 2.00135E−01 | 1.36215E−01 | −1.12473E−01 | −1.33819E−02 | 7.23327E−05 |
| A16 = | | −2.39688E−01 | 9.40263E−02 | 1.21652E−02 | |

In the image capturing optical lens assembly according to the 2nd embodiment, the definitions of f, Fno, HFOV, V1, V2, V4, V5, CT2, CT3, CT4, CT5, T12, T23, T34, R4, R6, R7, R8, f1, f3, f4, TTL and ImgH are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 3.19 | T23/T34 | 0.25 |
| Fno | 2.35 | R4/f | 0.70 |
| HFOV (deg.) | 34.9 | R6/f | −0.49 |
| V1 − V2 | 48.0 | (R7 − R8)/(R7 + R8) | −0.01 |
| V5 − V4 | 33.0 | (f/f3) − (f/f1) | 0.18 |
| CT4/CT5 | 0.33 | f/f3 | 1.18 |
| CT5/(CT2 + CT3 + CT4) | 0.78 | f/f4 | 0.23 |
| T12/T34 | 1.10 | TTL/ImgH | 1.71 |
| T23/CT5 | 0.09 | | |

3rd Embodiment

Figure 5:
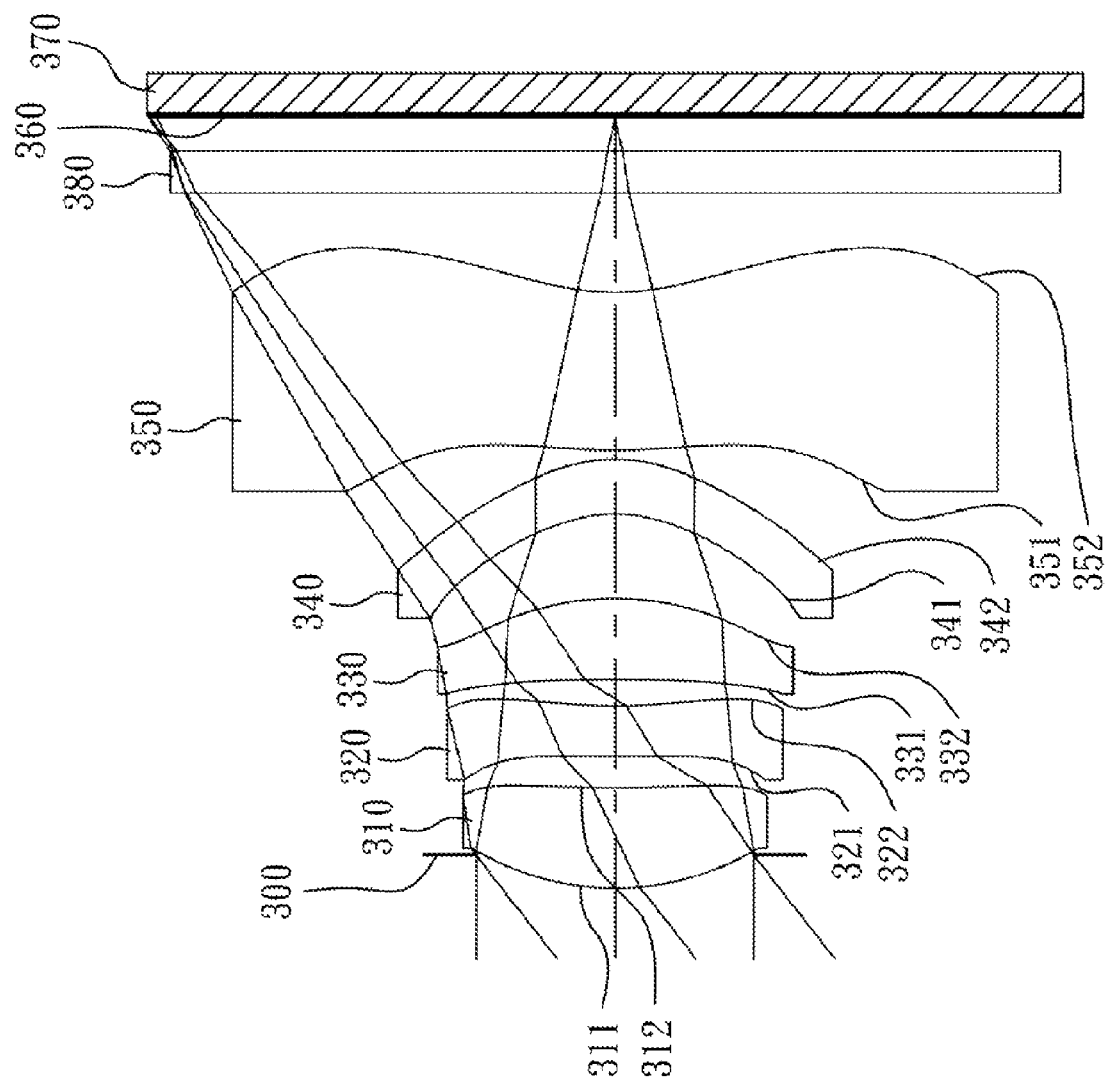
FIG. 5 is a schematic view of an image capturing optical lens assembly according to the 3rd embodiment of the present disclosure.
Figure 6:
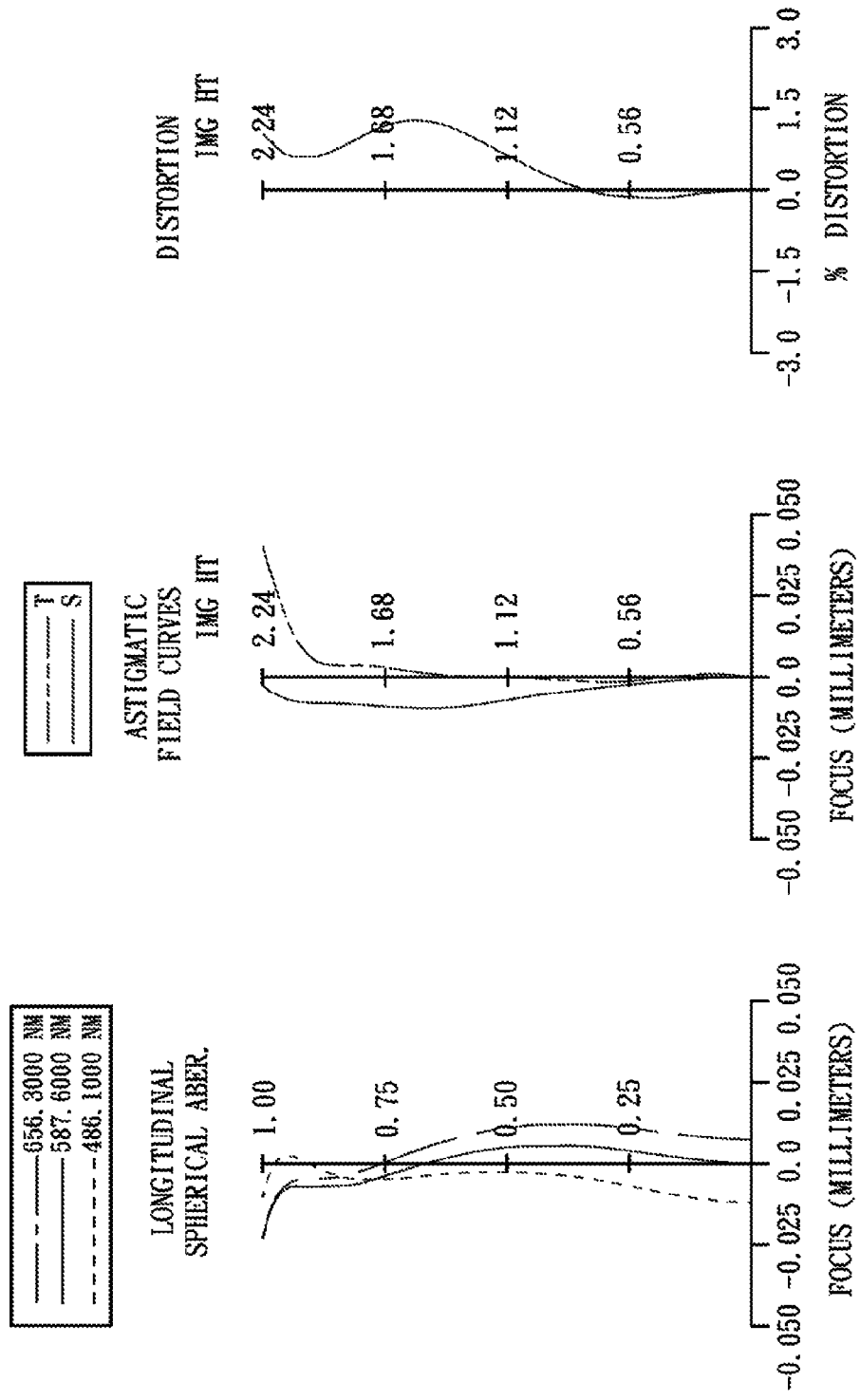
FIG. 6 shows spherical aberration curves, astigmatic field curves and a distortion curve of the image capturing optical lens assembly according to the 3rd Embodiment.

FIG. 5 is a schematic view of an image capturing optical lens assembly according to the 3rd embodiment of the present disclosure. FIG. 6 shows spherical aberration curves, astigmatic field curves and a distortion curve of the image capturing optical lens assembly according to the 3rd embodiment. FIG. 5, the image capturing optical lens assembly includes, in order from an object side to an image side, an aperture stop 300, the first lens element 310, the second lens element 320, the third lens element 330, the fourth lens element 340, the fifth lens element 350, an IR-cut filter 380, an image plane 360 and an image sensor 370.

The first lens element 310 with positive refractive power has a convex object-side surface 311 and a concave image-side surface 312. It is made of plastic material with the object-side surface 311 and the image-side surface 312 being aspheric.

The second lens element 320 with negative refractive power has a convex object-side surface 321 and a concave image-side surface 322. It is made of plastic material with the object-side surface 321 and the image-side surface 322 being aspheric.

The third lens element 330 with positive refractive power has a concave object-side surface 331 and a convex image-side surface 332. It is made of plastic material with the object-side surface 331 and the image-side surface 332 being aspheric.

The fourth lens element 340 with positive refractive power has a concave object-side surface 341 and a convex image-side surface 342. It is made of plastic material with the object-side surface 341 and the image-side surface 342 being aspheric.

The fifth lens element 350 with negative refractive power has a convex object-side surface 351 and a concave image-side surface 352. It is made of plastic material with the object-side surface 351 and the image-side surface 352 being aspheric. Furthermore, the fifth lens element 350 has inflection points formed on the object-side surface 351 and the image-side surface 352 thereof.

The IR-cut filter 380 is made of glass material, wherein the IR-cut filter 380 is located between the fifth lens element 350 and the image plane 360, and will not affect the focal length of the image capturing optical lens assembly.

The detailed optical data of the 3rd embodiment are shown in Table 5 and the aspheric surface data are shown in Table 6 below.

TABLE 5

3rd Embodiment
f = 2.86 mm, Fno = 2.15, HFOV = 37.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.157 | | | | |
| 2 | Lens 1 | 1.323080 (ASP) | 0.478 | Plastic | 1.544 | 55.9 | 3.08 |
| 3 | | 5.515000 (ASP) | 0.152 | | | | |
| 4 | Lens 2 | 7.168200 (ASP) | 0.240 | Plastic | 1.650 | 21.4 | −5.69 |
| 5 | | 2.407110 (ASP) | 0.126 | | | | |
| 6 | Lens 3 | −23.529400 (ASP) | 0.388 | Plastic | 1.544 | 55.9 | 2.95 |
| 7 | | −1.510610 (ASP) | 0.407 | | | | |
| 8 | Lens 4 | −0.696830 (ASP) | 0.260 | Plastic | 1.650 | 21.4 | 22.78 |
| 9 | | −0.763290 (ASP) | 0.044 | | | | |
| 10 | Lens 5 | 2.797630 (ASP) | 0.754 | Plastic | 1.544 | 55.9 | −3.60 |
| 11 | | 1.043180 (ASP) | 0.480 | | | | |

TABLE 5-continued

3rd Embodiment
f = 2.86 mm, Fno = 2.15, HFOV = 37.8 deg.

| Surface # | | Curvature Radius | Thickness | Material | Index | Abbe # | Focal length |
|---|---|---|---|---|---|---|---|
| 12 | IR-cut filter | Plano | 0.200 | Glass | 1.517 | 64.2 | — |
| 13 | | Plano | 0.171 | | | | |
| 14 | Image | Plano | — | | | | |

Note:
Reference wavelength (d-line) is 587.6 nm.

TABLE 6

Aspheric Coefficients

| | Surface # | | | | |
|---|---|---|---|---|---|
| | 2 | 3 | 4 | 5 | 6 |
| k = | −5.03582E−02 | 1.27240E+00 | −2.30281E+01 | −2.13082E+01 | −1.00000E+00 |
| A4 = | 8.71691E−04 | −1.75269E−01 | −5.44442E−01 | −2.64378E−01 | −2.22136E−01 |
| A6 = | 4.21114E−02 | 9.02423E−02 | 5.59835E−01 | 3.33349E−01 | 3.23970E−02 |
| A8 = | −2.63536E−01 | −5.88640E−01 | −1.78506E+00 | −5.98732E−01 | 6.75644E−01 |
| A10 = | 7.54642E−01 | 1.37414E−01 | 1.27202E+00 | 1.23193E−01 | −4.14888E−01 |
| A12 = | −1.18497E+00 | −3.72650E−01 | 1.38078E−02 | 5.23447E−02 | −1.72300E+00 |
| A14 = | 8.55185E−02 | −1.22676E−01 | 7.84949E−02 | −4.25533E−02 | 2.95975E+00 |
| A16 = | | | | | −1.81800E+00 |

| | Surface # | | | | |
|---|---|---|---|---|---|
| | 8 | 9 | 10 | 11 | 12 |
| k = | 1.42076E+00 | −2.19926E+00 | −7.48250E−01 | −3.80580E+01 | −7.83552E+00 |
| A4 = | −6.74663E−02 | 1.46843E−01 | 4.75239E−01 | −2.11702E−01 | −8.98452E−02 |
| A6 = | 4.40821E−02 | −7.74687E−01 | −3.88514E−01 | 8.88598E−02 | 4.43223E−02 |
| A8 = | 1.35532E−01 | 1.31641E+00 | 1.19906E−01 | −5.46374E−02 | −2.12310E−02 |
| A10 = | 6.58398E−01 | −1.16059E+00 | 1.98763E−01 | 1.35938E−02 | 5.74450E−03 |
| A12 = | −4.76766E−01 | 1.43941E−01 | −1.32435E−01 | 6.45176E−03 | −9.54027E−04 |
| A14 = | 1.26693E−01 | 3.67169E−01 | −1.54038E−01 | −5.01246E−04 | 7.97771E−05 |
| A16 = | | −3.81990E−01 | 1.31568E−01 | −6.87416E−04 | |

In the image capturing optical lens assembly according to the 3rd embodiment, the definitions of f, Fno, HFOV, V1, V2, V4, V5, CT2, CT3, CT4, CT5, T12, T23, T34, R4, R6, R7, R8, f1, f3, f4, TTL and ImgH are the same as those stated in the 1st embodiment with corresponding values for the 3rd embodiment. Moreover, these parameters can be calculated from Table 3 and Table 4 as the following values and satisfy the following relationships:

| f (mm) | 2.86 | T23/T34 | 0.31 |
|---|---|---|---|
| Fno | 2.15 | R4/f | 0.84 |
| HFOV (deg.) | 37.8 | R6/f | −0.53 |
| V1 − V2 | 34.5 | (R7 − R8)/(R7 + R8) | −0.05 |
| V5 − V4 | 34.5 | (f/f3) − (f/f1) | 0.04 |
| CT4/CT5 | 0.34 | f/f3 | 0.97 |
| CT5/(CT2 + CT3 + CT4) | 0.85 | f/f4 | 0.13 |
| T12/T34 | 0.37 | TTL/ImgH | 1.62 |
| T23/CT5 | 0.17 | | |

4th Embodiment

Figure 7:
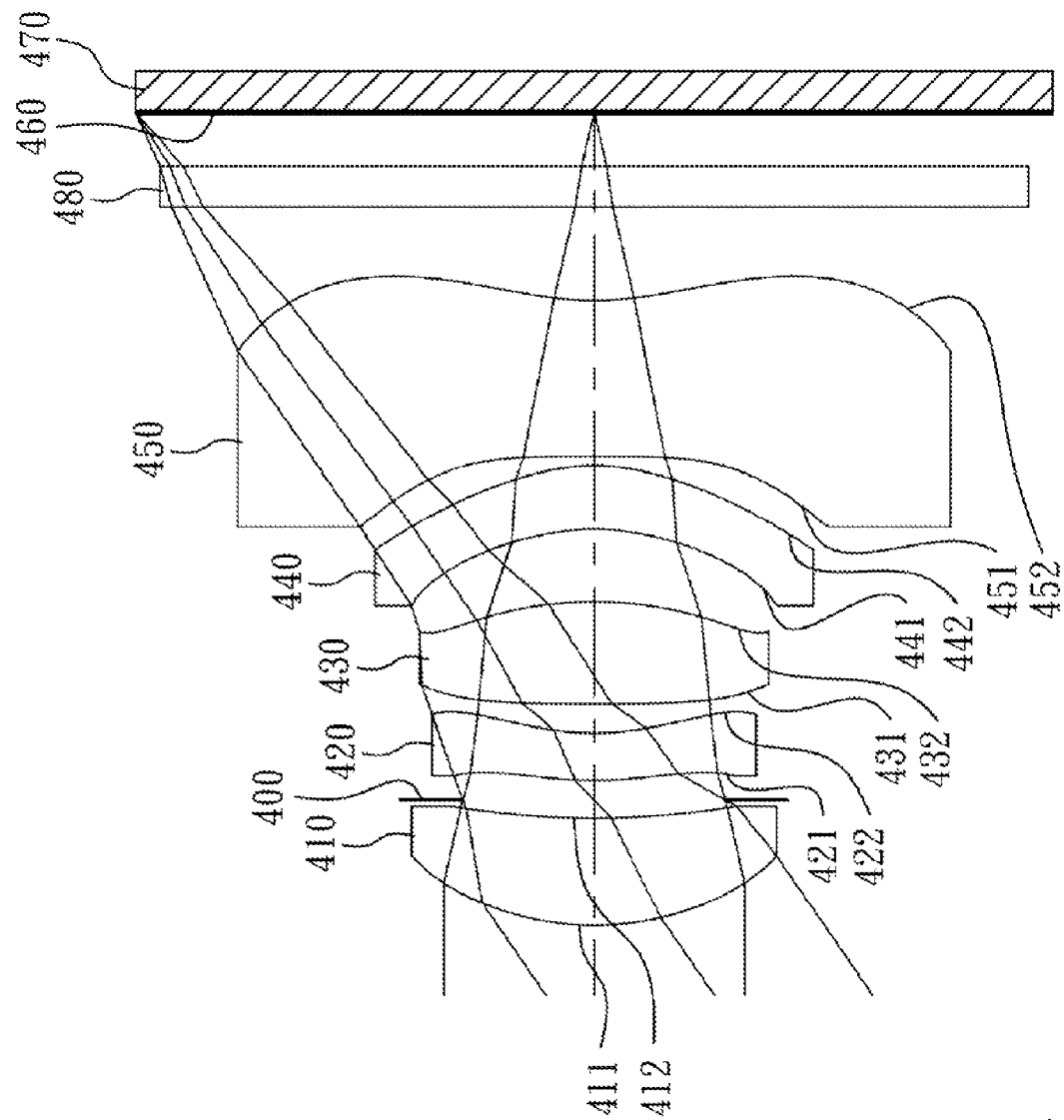
FIG. 7 is a schematic view of an image capturing optical lens assembly according to the 4th embodiment of the present disclosure.
Figure 8:
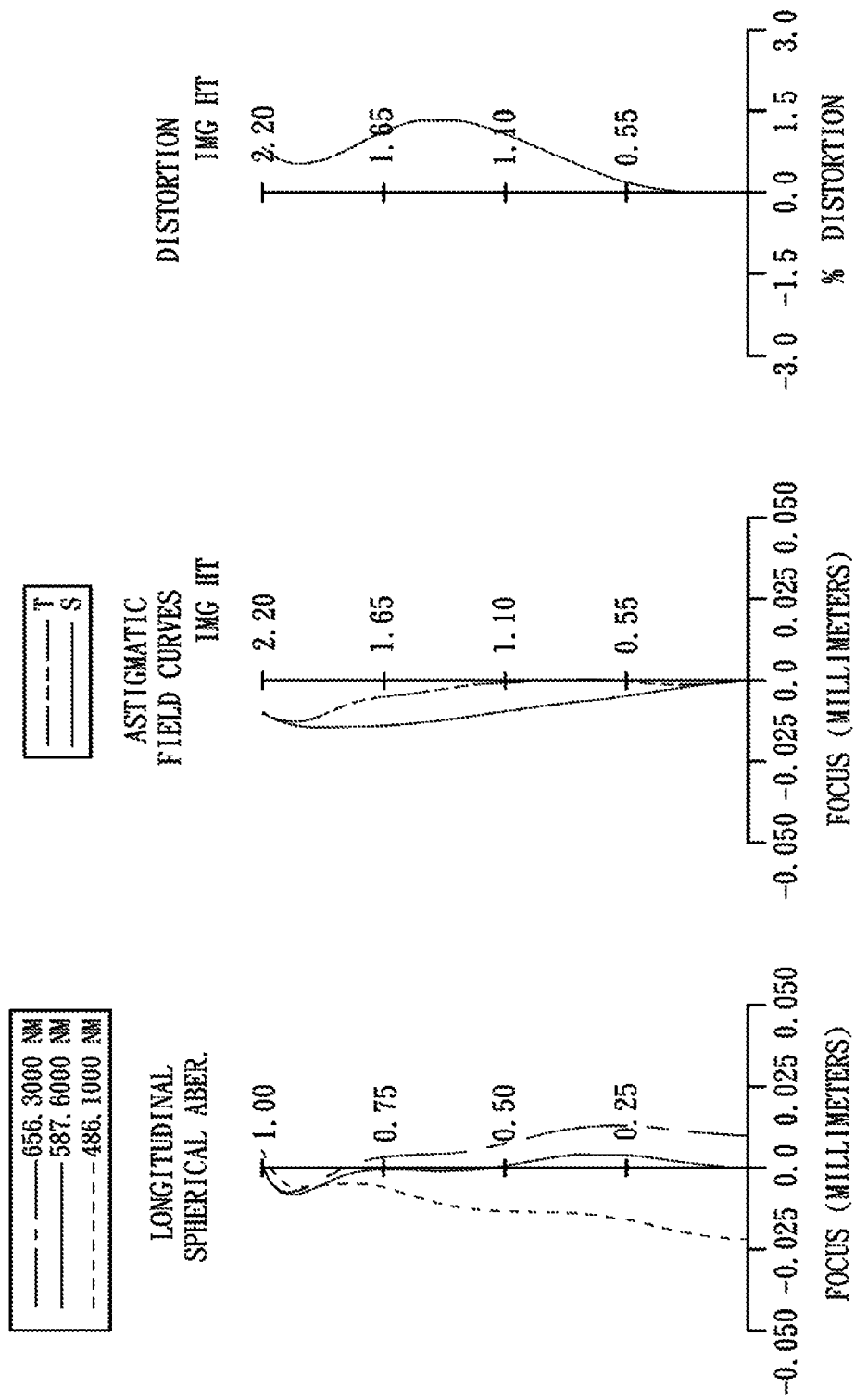
FIG. 8 shows spherical aberration curves, astigmatic field curves and a distortion curve of the image capturing optical lens assembly according to the 4th Embodiment.

FIG. 7 is a schematic view of an image capturing optical lens assembly according to the 4th embodiment of the present disclosure. FIG. 8 shows spherical aberration curves, astigmatic field curves and a distortion curve of the image capturing optical lens assembly according to the 4th embodiment. FIG. 7, the image capturing optical lens assembly includes, in order from an object side to an image side, the first lens element 410, an aperture stop 400, the second lens element 420, the third lens element 430, the fourth lens element 440, the fifth lens element 450, an IR-cut filter 480, an image plane 460 and an image sensor 470.

The first lens element 410 with positive refractive power has a convex object-side surface 411 and a concave image-side surface 412. It is made of glass material with the object-side surface 411 and the image-side surface 412 being aspheric.

The second lens element 420 with negative refractive power has a convex object-side surface 421 and a concave image-side surface 422. It is made of plastic material with the object-side surface 421 and the image-side surface 422 being aspheric.

The third lens element 430 with positive refractive power has a convex object-side surface 431 and a convex image-side surface 432. It is made of plastic material with the object-side surface 431 and the image-side surface 432 being aspheric.

The fourth lens element 440 with positive refractive power has a concave object-side surface 441 and a convex image-side surface 442. It is made of plastic material with the object-side surface 441 and the image-side surface 442 being aspheric.

The fifth lens element 450 with negative refractive power has a concave object-side surface 451 and a concave image-side surface 452. It is made of plastic material with the object-side surface 451 and the image-side surface 452 being aspheric. Furthermore, the fifth lens element 450 has inflection points formed on the object-side surface 451 and the image-side surface 452 thereof.

The IR-cut filter 480 is made of glass material, wherein the IR-cut filter 480 is located between the fifth lens element 450 and the image plane 460, and will not affect the focal length of the image capturing optical lens assembly.

The detailed optical data of the 4th embodiment are shown in Table 7 and the aspheric surface data are shown in Table 8 below.

TABLE 7

4th Embodiment
f = 3.18 mm, Fno = 2.20, HFOV = 34.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.419570 (ASP) | 0.513 | Glass | 1.569 | 71.3 | 3.93 |
| 2 | | 3.381000 (ASP) | 0.088 | | | | |
| 3 | Ape. Stop | Plano | 0.094 | | | | |
| 4 | Lens 2 | 1.764120 (ASP) | 0.230 | Plastic | 1.640 | 23.3 | −10.46 |
| 5 | | 1.325180 (ASP) | 0.137 | | | | |
| 6 | Lens 3 | 14.989600 (ASP) | 0.494 | Plastic | 1.544 | 55.9 | 3.03 |
| 7 | | −1.828140 (ASP) | 0.347 | | | | |
| 8 | Lens 4 | −1.065450 (ASP) | 0.305 | Plastic | 1.640 | 23.3 | 8.10 |
| 9 | | −0.982450 (ASP) | 0.043 | | | | |
| 10 | Lens 5 | −45.454500 (ASP) | 0.749 | Plastic | 1.544 | 55.9 | −2.44 |
| 11 | | 1.374450 (ASP) | 0.450 | | | | |
| 12 | IR-cut filter | Plano | 0.200 | Glass | 1.517 | 64.2 | — |
| 13 | | Plano | 0.252 | | | | |
| 14 | Image | Plano | — | | | | |

Note:
Reference wavelength (d-line) is 587.6 nm.

TABLE 8

Aspheric Coefficients

| | Surface # | | | | |
|---|---|---|---|---|---|
| | 1 | 2 | 4 | 5 | 6 |
| k = | −6.28349E−02 | −2.00000E+01 | −3.93736E+00 | −9.79654E−01 | −3.35126E+00 |
| A4 = | 3.06196E−03 | −7.51857E−02 | −4.59255E−01 | −3.49822E−01 | 8.65503E−02 |
| A6 = | 5.83453E−02 | 1.32631E−01 | 1.13264E−01 | −5.10889E−02 | −4.42813E−02 |
| A8 = | −9.95031E−02 | 3.74908E−01 | −3.32304E−01 | 4.93364E−01 | 4.24904E−01 |
| A10 = | 2.68971E−01 | −1.49287E+00 | 5.98379E−01 | −4.94095E−01 | 5.58771E−02 |
| A12 = | −2.50266E−01 | 2.22463E+00 | −1.29640E−01 | −1.19399E+00 | −1.75993E+00 |
| A14 = | 1.28587E−01 | −1.35362E+00 | −2.03336E+00 | 9.97571E−01 | 2.41496E+00 |
| A16 = | | | | | −1.02108E+00 |

| | Surface # | | | | |
|---|---|---|---|---|---|
| | 7 | 8 | 9 | 10 | 11 |
| k = | 8.68361E−01 | −1.15297E+00 | −6.48291E−01 | −1.00000E+00 | −1.13906E+01 |
| A4 = | 3.65375E−02 | 4.09897E−01 | 4.68642E−01 | −2.92986E−01 | −1.31707E−01 |
| A6 = | −6.85988E−02 | −8.14522E−01 | −5.38333E−01 | 5.04462E−02 | 7.12963E−02 |
| A8 = | 3.94719E−02 | 4.86150E−01 | 2.24760E−01 | 6.65874E−04 | −4.04165E−02 |
| A10 = | 4.38203E−01 | −2.10638E−01 | 1.74374E−01 | 3.24633E−02 | 1.40593E−02 |
| A12 = | −6.02879E−01 | 4.76362E−01 | −8.60945E−02 | −1.29266E−02 | −2.99235E−03 |
| A14 = | 7.98787E−01 | −7.75542E−01 | −1.11467E−01 | −1.71910E−02 | 2.78757E−04 |
| A16 = | | 2.16157E−01 | 6.39583E−02 | 1.16598E−02 | |

In the image capturing optical lens assembly according to the 4th embodiment, the definitions of f, Fno, HFOV, V1, V2, V4, V5, CT2, CT3, CT4, CT5, T12, T23, T34, R4, R6, R7, R8, f1, f3, f4, TTL and ImgH are the same as those stated in the 1st embodiment with corresponding values for the 4th embodiment. Moreover, these parameters can be calculated from Table 7 and Table 8 as the following values and satisfy the following relationships:

| f (mm) | 3.18 | T23/T34 | 0.39 |
|---|---|---|---|
| Fno | 2.20 | R4/f | 0.42 |
| HFOV (deg.) | 34.5 | R6/f | −0.58 |
| V1 − V2 | 48.0 | (R7 − R8)/(R7 + R8) | 0.04 |
| V5 − V4 | 32.6 | (f/f3) − (f/f1) | 0.24 |
| CT4/CT5 | 0.41 | f/f3 | 1.05 |

-continued

| CT5/(CT2 + CT3 + CT4) | 0.73 | f/f4 | 0.39 |
|---|---|---|---|
| T12/T34 | 0.52 | TTL/ImgH | 1.74 |
| T23/CT5 | 0.18 | | |

5th Embodiment

Figure 9:
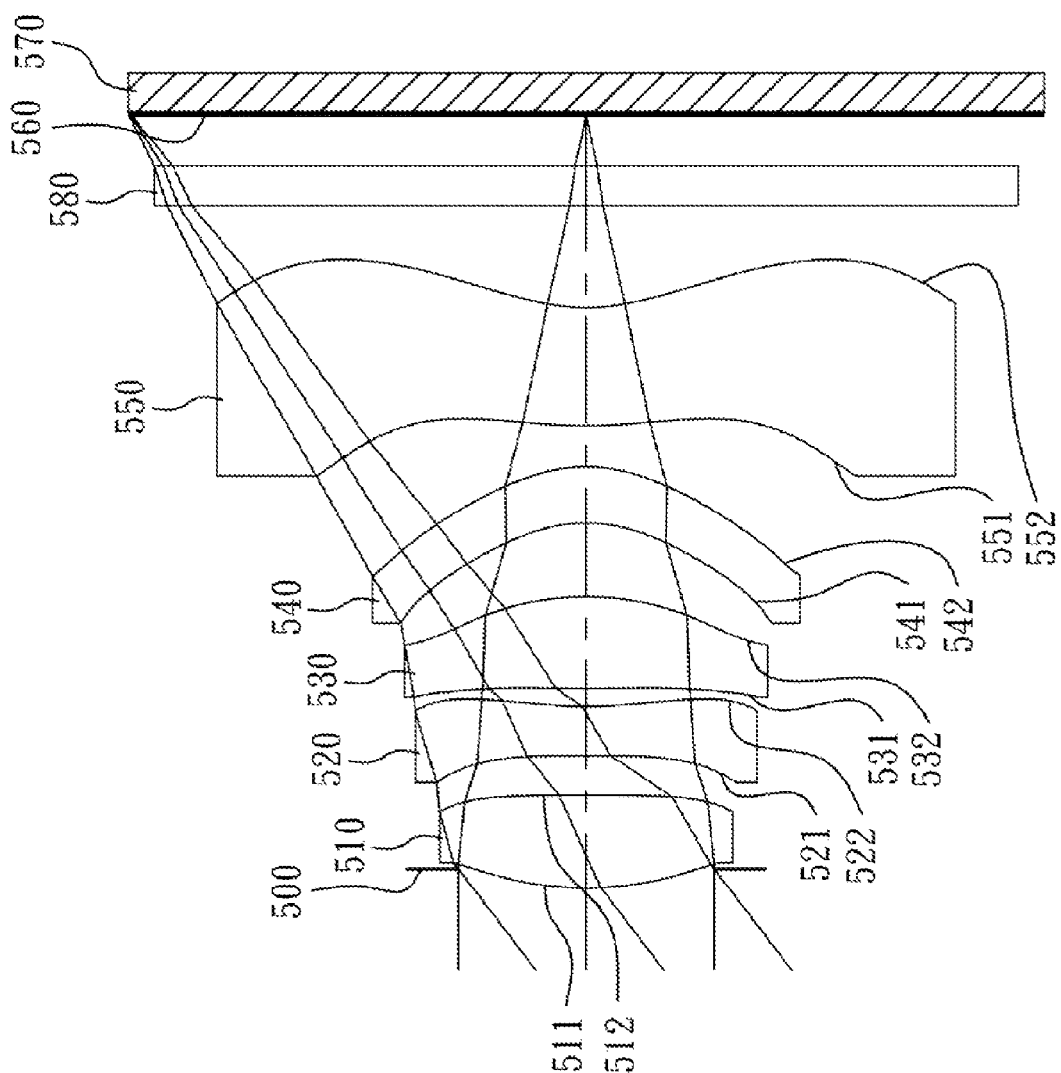
FIG. 9 is a schematic view of an image capturing optical lens assembly according to the 5th embodiment of the present disclosure.
Figure 10:
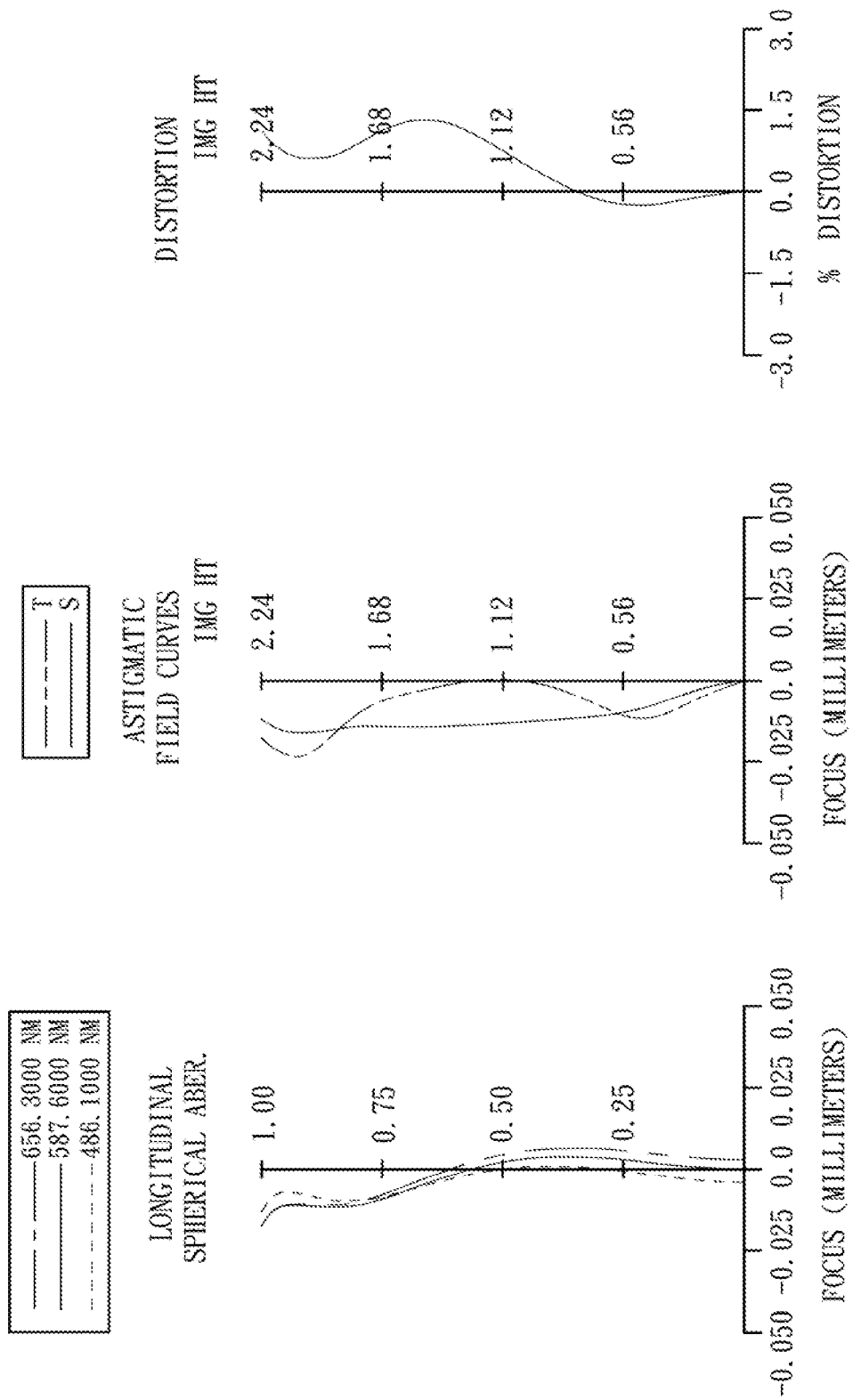
FIG. 10 shows spherical aberration curves, astigmatic field curves and a distortion curve of the image capturing optical lens assembly according to the 5th Embodiment.

FIG. 9 is a schematic view of an image capturing optical lens assembly according to the 5th embodiment of the present disclosure. FIG. 10 shows spherical aberration curves, astigmatic field curves and a distortion curve of the image capturing optical lens assembly according to the 5th embodiment. In FIG. 9, the image capturing optical lens assembly includes, in order from an object side to an image side, an aperture stop 500, the first lens element 510, the second lens element 520, the third lens element 530, the fourth lens element 540, the fifth lens element 550, an IR-cut filter 580, an image plane 560 and an image sensor 570.

The first lens element 510 with positive refractive power has a convex object-side surface 511 and a convex image-side surface 512. It is made of plastic material with the object-side surface 511 and the image-side surface 512 being aspheric.

The second lens element 520 with negative refractive power has a concave object-side surface 521 and a concave image-side surface 522. It is made of plastic material with the object-side surface 521 and the image-side surface 522 being aspheric.

The third lens element 530 with positive refractive power has a convex object-side surface 531 and a convex image-side surface 532. It is made of plastic material with the object-side surface 531 and the image-side surface 532 being aspheric.

The fourth lens element 540 with positive refractive power has a concave object-side surface 541 and a convex image-side surface 542. It is made of plastic material with the object-side surface 541 and the image-side surface 542 being aspheric.

The fifth lens element 550 with negative refractive power has a convex object-side surface 551 and a concave image-side surface 552. It is made of plastic material with the object-side surface 551 and the image-side surface 552 being aspheric. Furthermore, the fifth lens element 550 has inflection points formed on the object-side surface 551 and the image-side surface 552 thereof.

The IR-cut filter 580 is made of glass material, wherein the IR-cut filter 580 is located between the fifth lens element 550 and the image plane 560, and will not affect the focal length of the image capturing optical lens assembly.

The detailed optical data of the 5th embodiment are shown in Table 9 and the aspheric surface data are shown in Table 10 below.

TABLE 9

5th Embodiment
f = 2.91 mm, Fno = 2.32, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.095 | | | | |
| 2 | Lens 1 | 1.562370 (ASP) | 0.454 | Plastic | 1.544 | 55.9 | 2.79 |
| 3 | | −46.511600 (ASP) | 0.196 | | | | |
| 4 | Lens 2 | −31.727000 (ASP) | 0.240 | Plastic | 1.640 | 23.3 | −3.13 |
| 5 | | 2.145210 (ASP) | 0.088 | | | | |
| 6 | Lens 3 | 10.967400 (ASP) | 0.453 | Plastic | 1.544 | 55.9 | 2.31 |
| 7 | | −1.397710 (ASP) | 0.360 | | | | |
| 8 | Lens 4 | −0.705470 (ASP) | 0.277 | Plastic | 1.640 | 23.3 | 13.54 |
| 9 | | −0.752280 (ASP) | 0.199 | | | | |
| 10 | Lens 5 | 2.445600 (ASP) | 0.579 | Plastic | 1.535 | 56.3 | −3.21 |
| 11 | | 0.925440 (ASP) | 0.500 | | | | |
| 12 | IR-cut filter | Plano | 0.200 | Glass | 1.517 | 64.2 | — |
| 13 | | Plano | 0.251 | | | | |
| 14 | Image | Plano | — | | | | |

Note:
Reference wavelength (d-line) is 587.6 nm.

TABLE 10

Aspheric Coefficients

| Surface # | | | | |
|---|---|---|---|---|
| 2 | 3 | 4 | 5 | 6 |
| k = −4.91915E−01 | −1.00000E+00 | 3.00000E+00 | −1.75471E+01 | −1.05212E+01 |
| A4 = −1.88150E−02 | −1.71726E−01 | −5.36205E−01 | −3.06253E−01 | −2.55552E−01 |
| A6 = 5.65578E−04 | −1.75744E−02 | 6.70737E−01 | 3.74589E−01 | 1.17649E−02 |
| A8 = −3.41684E−01 | −5.11963E−01 | −1.59528E+00 | −4.99372E−01 | 5.81047E−01 |
| A10 = 5.67501E−01 | 4.00015E−01 | 1.31181E+00 | −7.81078E−03 | −1.95665E−01 |
| A12 = −1.18497E+00 | −3.72650E−01 | 1.38079E−02 | 5.51586E−02 | −1.69685E+00 |
| A14 = 8.55185E−02 | −1.22676E−01 | 7.84949E−02 | 8.90428E−03 | 2.99961E+00 |
| A16 = | | | | −1.81800E+00 |

| Surface # | | | | |
|---|---|---|---|---|
| 7 | 8 | 9 | 10 | 11 |
| k = 1.13459E+00 | −2.00439E+00 | −7.58144E−01 | −2.00000E+01 | −6.12550E+00 |
| A4 = 8.74539E−03 | 2.08121E−01 | 4.85978E−01 | −2.20268E−01 | −1.07242E−01 |
| A6 = 3.20925E−02 | −7.31261E−01 | −3.86229E−01 | 7.51003E−02 | 4.96128E−02 |

TABLE 10-continued

| Aspheric Coefficients | | | | | |
|---|---|---|---|---|---|
| A8 = | 1.43316E−01 | 1.31451E+00 | 1.22432E−01 | −5.29865E−02 | −2.32360E−02 |
| A10 = | 6.53569E−01 | −1.21433E+00 | 1.90608E−01 | 1.37488E−02 | 6.02179E−03 |
| A12 = | −5.41568E−01 | 1.31763E−01 | −1.33932E−01 | 6.29839E−03 | −8.37324E−04 |
| A14 = | 1.39046E−01 | 4.41974E−01 | −1.53126E−01 | −4.79716E−04 | 5.59087E−05 |
| A16 = | | −3.60085E−01 | 1.31735E−01 | −6.61097E−04 | |

In the image capturing optical lens assembly according to the 5th embodiment, the definitions of f, Fno, HFOV, V1, V2, V4, V5, CT2, CT3, CT4, CT5, T12, T23, T34, R4, R6 R7, R8, f1, f3, f4, TTL and ImgH are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 2.91 | T23/T34 | 0.24 |
| Fno | 2.32 | R4/f | 0.74 |
| HFOV (deg.) | 37.3 | R6/f | −0.48 |
| V1 − V2 | 32.6 | (R7 − R8)/(R7 + R8) | −0.03 |
| V5 − V4 | 33.0 | (f/f3) − (f/f1) | 0.22 |
| CT4/CT5 | 0.48 | f/f3 | 1.26 |
| CT5/(CT2 + CT3 + CT4) | 0.60 | f/f4 | 0.21 |
| T12/T34 | 0.54 | TTL/ImgH | 1.66 |
| T23/CT5 | 0.15 | | |

6th Embodiment

Figure 11:
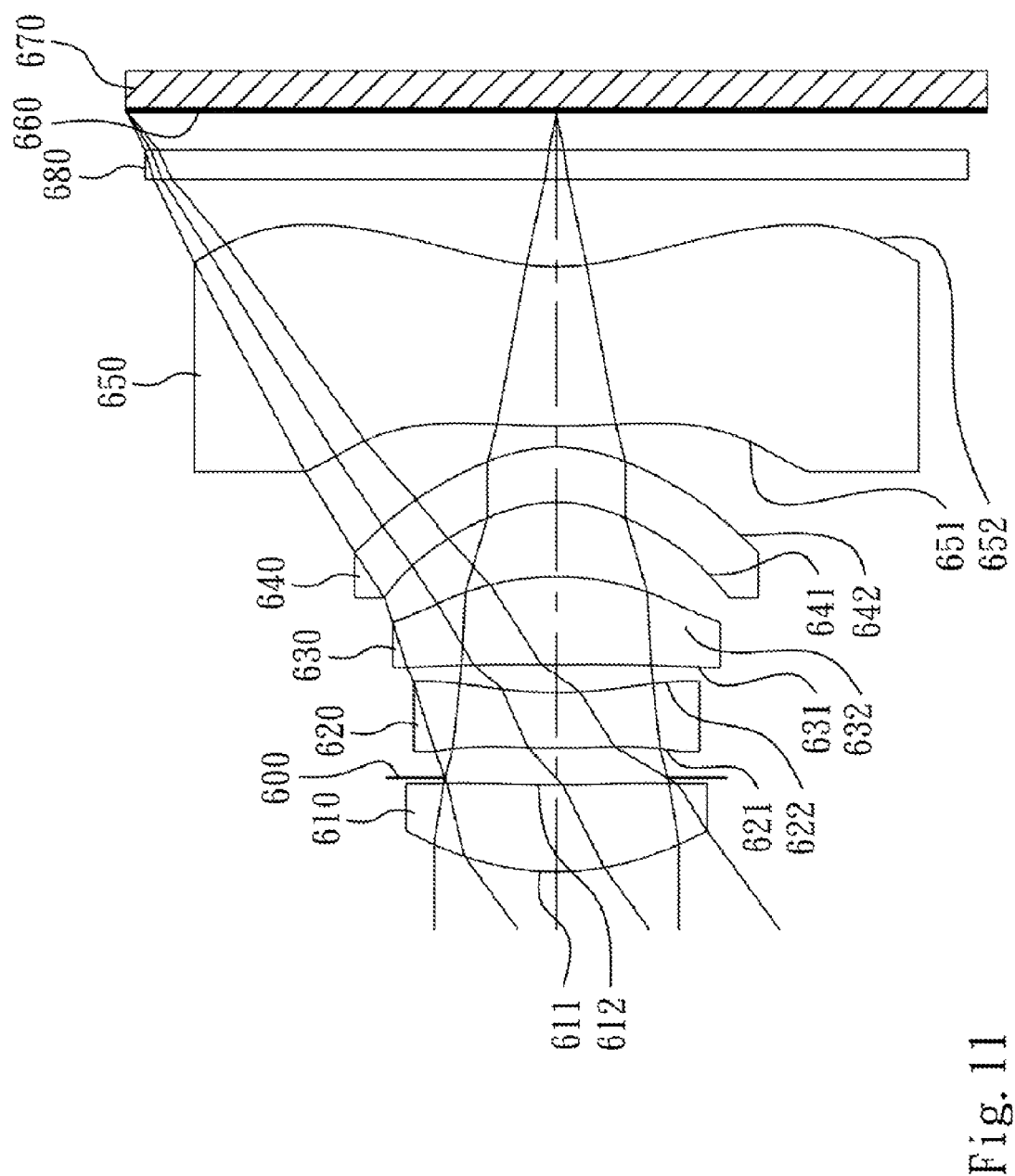
FIG. 11 is a schematic view of an image capturing optical lens assembly according to the 6th embodiment of the present disclosure.
Figure 12:
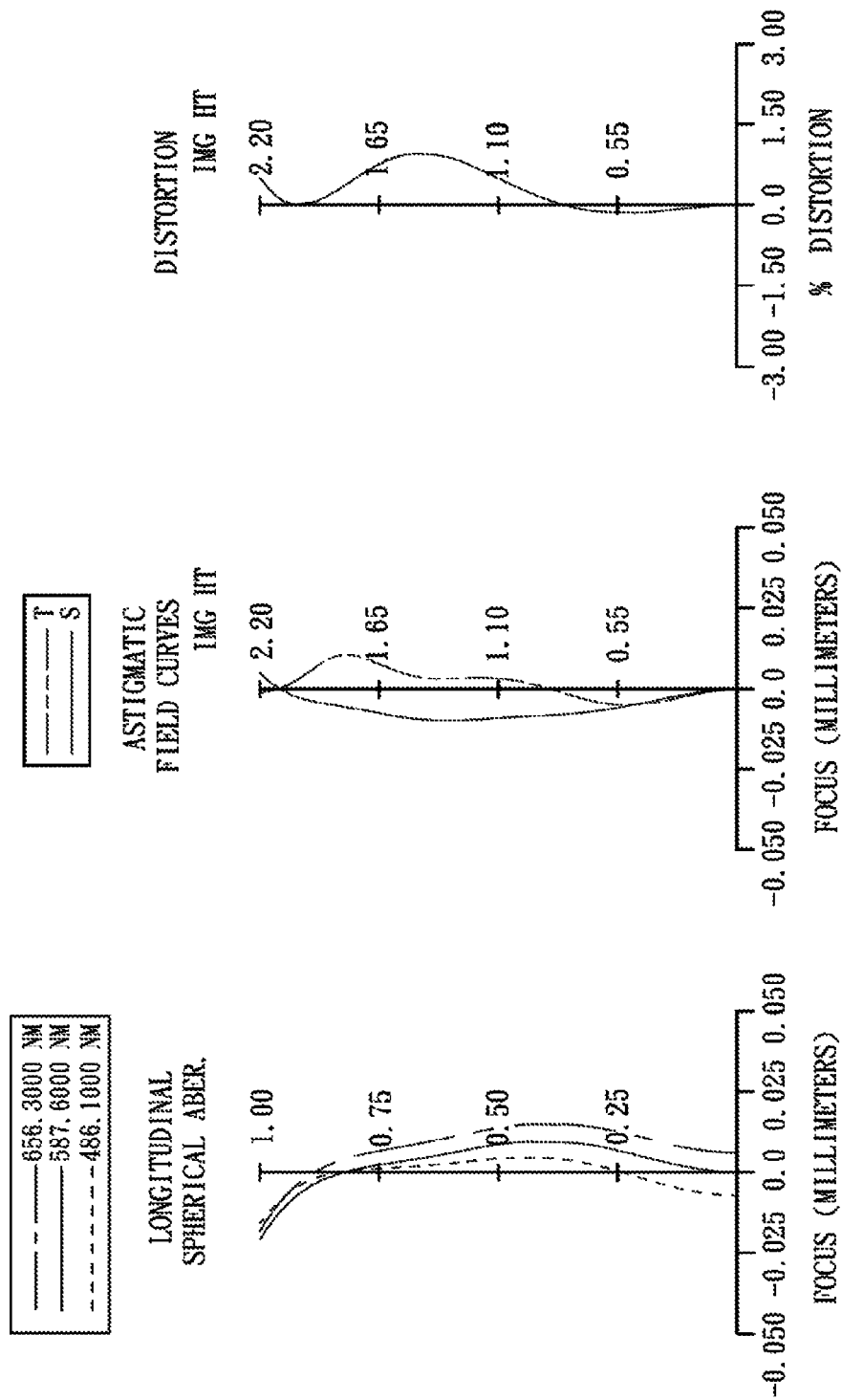
FIG. 12 shows spherical aberration curves, astigmatic field curves and a distortion curve of the image capturing optical lens assembly according to the 6th Embodiment.

FIG. 11 is a schematic view of an image capturing optical lens assembly according to the 6th embodiment of the present disclosure. FIG. 12 shows spherical aberration curves, astigmatic field curves and a distortion curve of the image capturing optical lens assembly according to the 6th embodiment. In FIG. 11, the image capturing optical lens assembly includes, in order from an object side to an image side, the first lens element 610, an aperture stop 600, the second lens element 620, the third lens element 630, the fourth lens to element 640, the fifth lens element 650, an IR-cut filter 680, an image plane 660 and an image sensor 670.

The first lens element 610 with positive refractive power has a convex object-side surface 611 and a concave image-side surface 612. It is made of plastic material with the object-side surface 611 and the image-side surface 612 being aspheric.

The second lens element 620 with negative refractive power has a convex object-side surface 621 and a concave image-side surface 622. It is made of plastic material with the object-side surface 621 and the image-side surface 622 being aspheric.

The third lens element 630 with positive refractive power has a convex object-side surface 631 and a convex image-side surface 632. It is made of plastic material with the object-side surface 631 and the image-side surface 632 being aspheric.

The fourth lens element 640 with positive refractive power has a concave object-side surface 641 and a convex image-side surface 642. It is made of plastic material with the object-side surface 641 and the image-side surface 642 being aspheric.

The fifth lens element 650 with negative refractive power has a convex object-side surface 651 and a concave image-side surface 652. It is made of plastic material with the object-side surface 651 and the image-side surface 652 being aspheric. Furthermore, the fifth lens element 650 has inflection points formed on the object-side surface 651 and the image-side surface 652 thereof.

The IR-cut filter 680 is made of glass material, wherein the IR-cut filter 680 is located between the fifth lens element 650 and the image plane 660, and will not affect the focal length of the image capturing optical lens assembly.

The detailed optical data of the 6th embodiment are shown in Table 11 and the aspheric surface data are shown in Table 12 below.

TABLE 11

6th Embodiment
f = 3.00 mm, Fno = 2.40, HFOV = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.437420 (ASP) | 0.445 | Plastic | 1.530 | 55.8 | 3.20 |
| 2 | | 8.419700 (ASP) | 0.034 | | | | |
| 3 | Ape. Stop | Plano | 0.154 | | | | |
| 4 | Lens 2 | 5.214600 (ASP) | 0.285 | Plastic | 1.650 | 21.4 | −4.69 |
| 5 | | 1.882470 (ASP) | 0.140 | | | | |
| 6 | Lens 3 | 14.88500 (ASP) | 0.453 | Plastic | 1.530 | 55.8 | 2.54 |
| 7 | | −1.469770 (ASP) | 0.379 | | | | |
| 8 | Lens 4 | −0.714280 (ASP) | 0.283 | Plastic | 1.607 | 26.6 | 33.30 |
| 9 | | −0.793190 (ASP) | 0.106 | | | | |
| 10 | Lens 5 | 4.245200 (ASP) | 0.815 | Plastic | 1.530 | 55.8 | −3.30 |
| 11 | | 1.156450 (ASP) | 0.450 | | | | |
| 12 | IR-cut filter | Plano | 0.150 | Glass | 1.517 | 64.2 | — |
| 13 | | Plano | 0.200 | | | | |
| 14 | Image | Plano | — | | | | |

Note:
Reference wavelength (d-line) is 587.6 nm.

TABLE 12

Aspheric Coefficients

| | Surface # | | | | |
|---|---|---|---|---|---|
| | 1 | 2 | 4 | 5 | 6 |
| k = | −2.17473E−01 | −1.00000E+00 | 1.22777E−02 | −1.43182E+01 | −1.00000E+00 |
| A4 = | −1.40970E−02 | −1.51025E−01 | −5.03613E−01 | −2.39379E−01 | −2.28282E−01 |
| A6 = | 1.49962E−01 | 2.09152E−01 | 7.41048E−01 | 3.71405E−01 | 2.58709E−02 |
| A8 = | −6.21006E−01 | −4.36402E−01 | −1.54302E+00 | −4.68363E−01 | 7.53003E−01 |
| A10 = | 1.31164E+00 | 3.52083E−01 | 1.18412E+00 | 1.04413E−02 | −3.67018E−01 |
| A12 = | −1.24970E+00 | −3.72649E−01 | 1.38084E−02 | 5.23453E−02 | −1.72300E+00 |
| A14 = | 8.55181E−02 | −1.22675E−01 | 7.84953E−02 | −4.25529E−02 | 2.95975E+00 |
| A16 = | | | | | −1.81800E+00 |

| | Surface # | | | | |
|---|---|---|---|---|---|
| | 7 | 8 | 9 | 10 | 11 |
| k = | 1.47349E+00 | −1.87964E+00 | −7.11510E−01 | −2.00000E+01 | −7.58294E+00 |
| A4 = | −1.23882E−02 | 2.09114E−01 | 4.58503E−01 | −2.38446E−01 | −8.25898E−02 |
| A6 = | 4.19594E−02 | −8.04085E−01 | −4.22906E−01 | 9.06756E−02 | 4.05263E−02 |
| A8 = | 9.97830E−02 | 1.21626E+00 | 1.20244E−01 | −5.47730E−02 | −2.02836E−02 |
| A10 = | 6.19564E−01 | −1.13344E+00 | 1.98288E−01 | 1.40172E−02 | 5.76040E−03 |
| A12 = | −4.48899E−01 | 2.15484E−01 | −1.26124E−01 | 7.85177E−03 | −1.00518E−03 |
| A14 = | 1.26694E−01 | 4.14914E−01 | −1.48353E−01 | 5.04703E−04 | 8.92783E−05 |
| A16 = | | −3.81989E−01 | 1.34126E−01 | −1.35532E−03 | |

In the image capturing optical lens assembly according to the 6th embodiment, the definitions of f, Fno, HFOV, V1, V2, V4, V5, CT2, CT3, CT4, CT5, T12, T23, T34, R4, R6, R7, R8, f1, f3, f4, TTL and ImgH are the same as those stated in the 1st embodiment with corresponding values for the 6th embodiment. Moreover, these parameters can be calculated from Table 11 and Table 12 as the following values and satisfy the following relationships:

| f (mm) | 3.00 | T23/T34 | 0.37 |
|---|---|---|---|
| Fno | 2.40 | R4/f | 0.63 |
| HFOV (deg.) | 36.1 | R6/f | −0.49 |
| V1 − V2 | 34.4 | (R7 − R8)/(R7 + R8) | −0.05 |
| V5 − V4 | 29.2 | (f/f3) − (f/f1) | 0.24 |
| CT4/CT5 | 0.35 | f/f3 | 1.18 |
| CT5/(CT2 + CT3 + CT4) | 0.80 | f/f4 | 0.09 |
| T12/T34 | 0.50 | TTL/ImgH | 1.75 |
| T23/CT5 | 0.17 | | |

7th Embodiment

Figure 13:
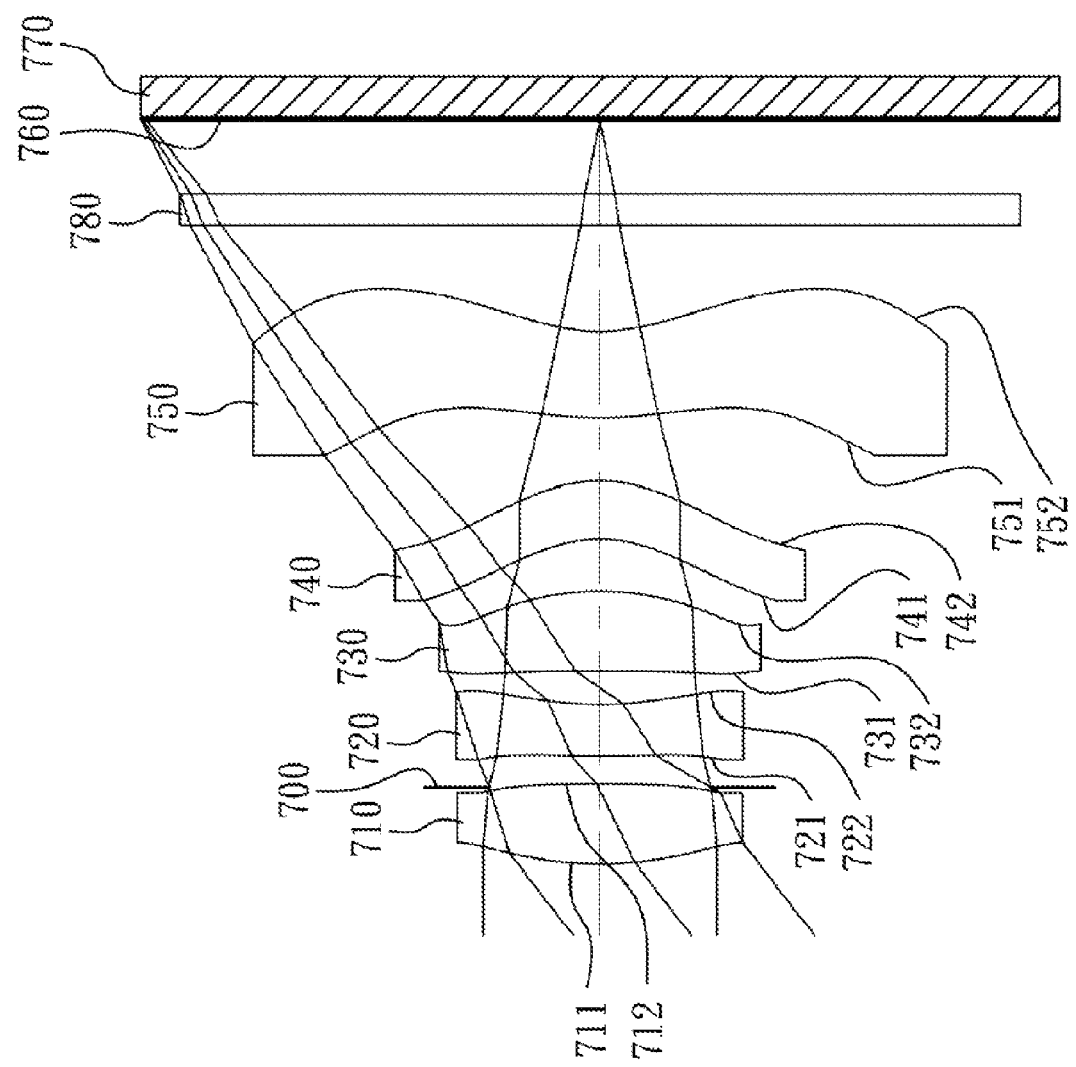
FIG. 13 is a schematic view of an image capturing optical lens assembly according to the 7th embodiment of the present disclosure.
Figure 14:
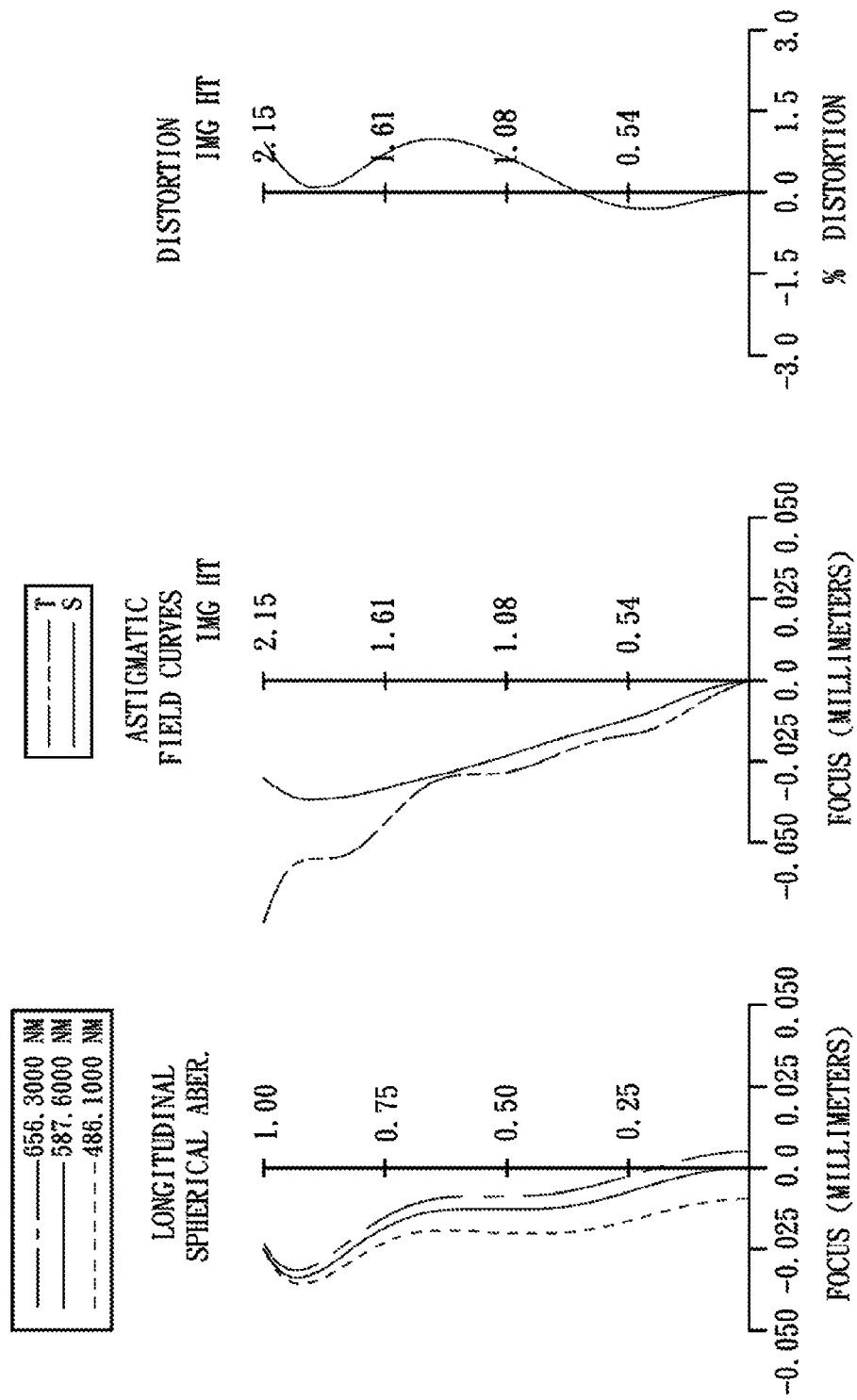
FIG. 14 shows spherical aberration curves, astigmatic field curves and a distortion curve of the image capturing optical lens assembly according to the 7th Embodiment.

FIG. 13 is a schematic view of an mage capturing optical lens assembly according to the 7th embodiment of the present disclosure. FIG. 14 shows spherical aberration curves, astigmatic field curves and a distortion curve of the image capturing optical lens assembly according to the 7th embodiment. In FIG. 13, the image capturing optical lens assembly includes, in order from an object side to an image side, the first lens element 710, an aperture stop 700, the second lens element 720, the third lens element 730, the fourth lens element 740, the fifth lens element 750, an IR-cut filter 780, an image plane 760 and an image sensor 770.

The first lens element 710 with positive refractive power has a convex object-side surface 711 and a convex image-side surface 712. It is made of plastic material with the object-side surface 711 and the image-side surface 712 being aspheric.

The second lens element 720 with negative refractive power has a convex object-side surface 721 and a concave image-side surface 722. It is made of plastic material with the object-side surface 721 and the image-side surface 722 being aspheric.

The third lens element 730 with positive refractive power has a concave object-side surface 731 and a convex image-side surface 732. It is made of plastic material with the object-side surface 731 and the image-side surface 732 being aspheric.

The fourth lens element 740 with positive refractive power has a concave object-side surface 741 and a convex image-side surface 742. It is made of plastic material with the object-side surface 741 and the image-side surface 742 being aspheric.

The fifth lens element 750 with negative refractive power has a convex object-side surface 751 and a concave image-side surface 752. It is made of plastic material with the object-side surface 751 and the image-side surface 752 being aspheric. Furthermore, the fifth lens element 750 has inflection points formed on the object-side surface 751 and the image-side surface 752 thereof.

The IR-cut filter 780 is made of glass material, wherein the IR-cut filter 780 is located between the fifth lens element 750 and the image plane 760, and will not affect the focal length of the image capturing optical lens assembly.

The detailed optical data of the 7th embodiment are shown in Table 13 and the aspheric surface data are shown in Table 14 below.

TABLE 13

7th Embodiment
f = 2.76 mm, Fno = 2.52, HFOV = 37.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.723570 (ASP) | 0.379 | Plastic | 1.544 | 55.9 | 2.63 |

TABLE 13-continued

7th Embodiment
f = 2.76 mm, Fno = 2.52, HFOV = 37.8 deg.

| Surface # | | Curvature Radius | Thickness | Material | Index | Abbe # | Focal length |
|---|---|---|---|---|---|---|---|
| 2 | | −7.812500 (ASP) | −0.017 | | | | |
| 3 | Ape. Stop | Plano | 0.147 | | | | |
| 4 | Lens 2 | 5.299900 (ASP) | 0.240 | Plastic | 1.640 | 23.3 | −3.62 |
| 5 | | 1.582650 (ASP) | 0.157 | | | | |
| 6 | Lens 3 | −100.000000 (ASP) | 0.375 | Plastic | 1.544 | 55.9 | 2.49 |
| 7 | | −1.338480 (ASP) | 0.245 | | | | |
| 8 | Lens 4 | −0.635870 (ASP) | 0.275 | Plastic | 1.544 | 55.9 | 11.40 |
| 9 | | −0.664480 (ASP) | 0.295 | | | | |
| 10 | Lens 5 | 1.724140 (ASP) | 0.405 | Plastic | 1.544 | 55.9 | −3.09 |
| 11 | | 0.780320 (ASP) | 0.500 | | | | |
| 12 | IR-cut filter | Plano | 0.150 | Glass | 1.517 | 64.2 | — |
| 13 | | Plano | 0.348 | | | | |
| 14 | Image | Plano | — | | | | |

Note:
Reference wavelength (d-line) is 587.6 nm.

TABLE 14

Aspheric Coefficients

| | Surface # | | | | |
|---|---|---|---|---|---|
| | 1 | 2 | 4 | 5 | 6 |
| k = | −2.07214E−01 | −1.00000E+00 | −1.05787E+01 | −1.34923E+01 | −1.00000E+00 |
| A4 = | −2.04377E−02 | −1.99920E−01 | −5.47173E−01 | −1.53771E−01 | −2.54038E−01 |
| A6 = | −3.47507E−01 | 2.15283E−01 | 9.68458E−01 | 3.32675E−01 | 1.91330E−01 |
| A8 = | 7.97644E−01 | −9.17550E−01 | −2.11538E+00 | −9.42427E−01 | 1.10843E+00 |
| A10 = | −1.07089E+00 | 4.64852E−01 | 4.80822E−01 | −1.93871E−01 | −6.22980E−01 |
| A12 = | −1.24967E+00 | −3.72653E−01 | 1.38045E−02 | 5.23414E−02 | −1.72301E+00 |
| A14 = | 8.55354E−02 | −1.22678E−01 | 7.84920E−02 | −4.25562E−02 | 2.95975E+00 |
| A16 = | | | | | −1.81801E+00 |

| | Surface # | | | | |
|---|---|---|---|---|---|
| | 7 | 8 | 9 | 10 | 11 |
| k = | 1.11071E+00 | −2.19413E+00 | −9.61997E−01 | −1.86983E+01 | −6.08172E+00 |
| A4 = | 7.30263E−03 | 2.83419E−01 | 6.57009E−01 | −2.57238E−01 | −1.65239E−01 |
| A6 = | 7.00038E−02 | −5.27284E−01 | −3.93664E−01 | 9.73731E−02 | 7.60823E−02 |
| A8 = | 3.01046E−01 | 1.47985E+00 | 1.35337E−01 | −5.04063E−02 | −3.18367E−02 |
| A10 = | 1.44830E+00 | −1.44890E+00 | 2.41219E−01 | 1.16528E−02 | 6.52849E−03 |
| A12 = | −3.88056E−01 | 2.27200E−01 | −1.02196E−01 | 8.75030E−03 | −8.13336E−04 |
| A14 = | 1.26691E−01 | 4.14911E−01 | −1.50636E−01 | 3.79956E−04 | 1.11721E−04 |
| A16 = | | −3.81991E−01 | 3.89541E−02 | −1.66161E−03 | |

In the image capturing optical lens assembly according to the 7th embodiment, the definitions of f, Fno, HFOV, V1, V2, V4, V5, CT2, CT3, CT4, CT5, T12, T23, T34, R4, R6, R7, R8, f1, f3, f4, TTL and ImgH are the same as those stated in the 1st embodiment with corresponding values for the 7th embodiment. Moreover, these parameters can be calculated from Table 13 and Table 14 as the following values and satisfy the following relationships:

| f (mm) | 2.76 | T23/T34 | 0.64 |
|---|---|---|---|
| Fno | 2.52 | R4/f | 0.57 |
| HFOV (deg.) | 37.8 | R6/f | −0.48 |
| V1 − V2 | 32.6 | (R7 − R8)/(R7 + R8) | −0.02 |
| V5 − V4 | 0.0 | (f/f3) − (f/f1) | 0.06 |
| CT4/CT5 | 0.68 | f/f3 | 1.11 |
| CT5/(CT2 + CT3 + CT4) | 0.46 | f/f4 | 0.24 |
| T12/T34 | 0.53 | TTL/ImgH | 1.60 |
| T23/CT5 | 0.39 | | |

8th Embodiment

Figure 15:
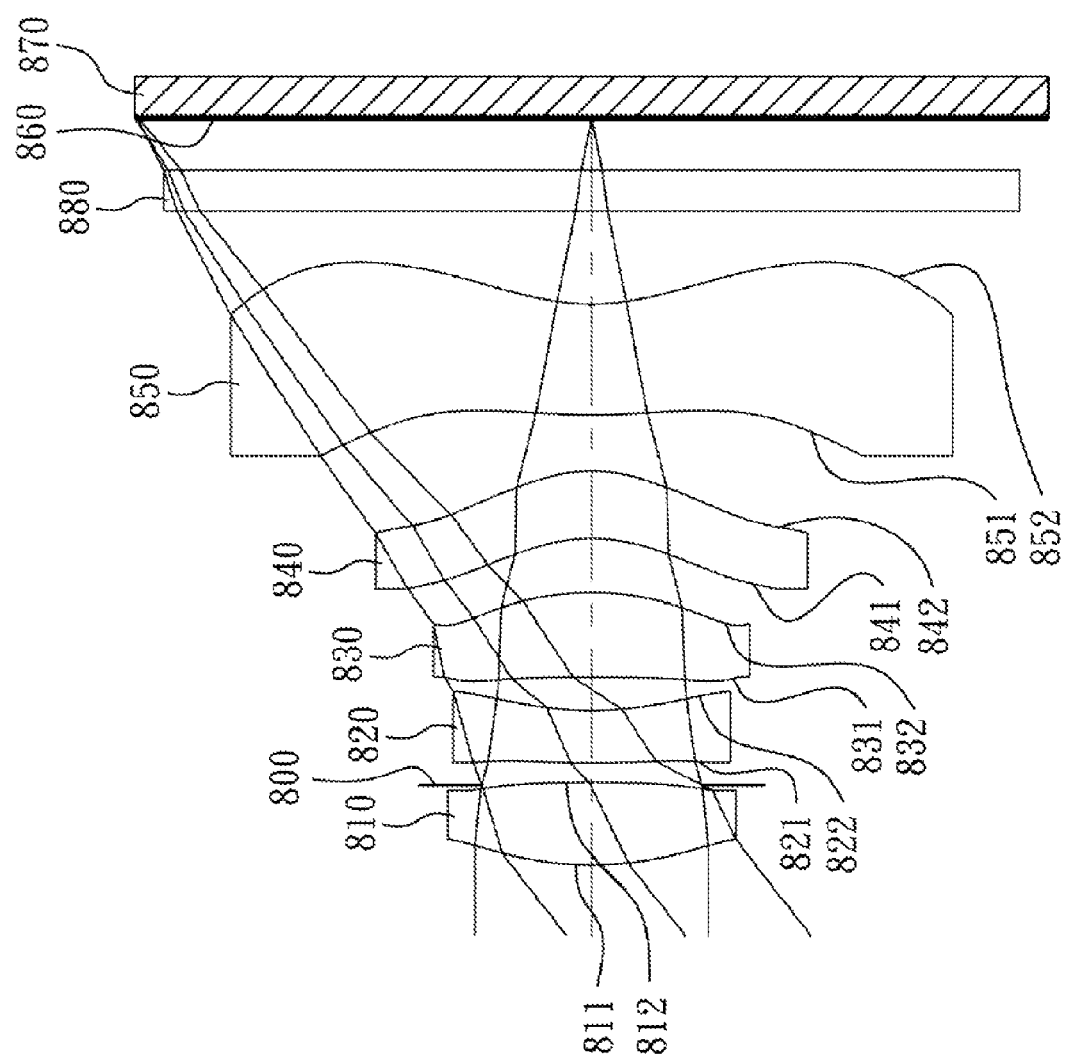
FIG. 15 is a schematic view of an image capturing optical lens assembly according to the 8th embodiment of the present disclosure.
Figure 16:
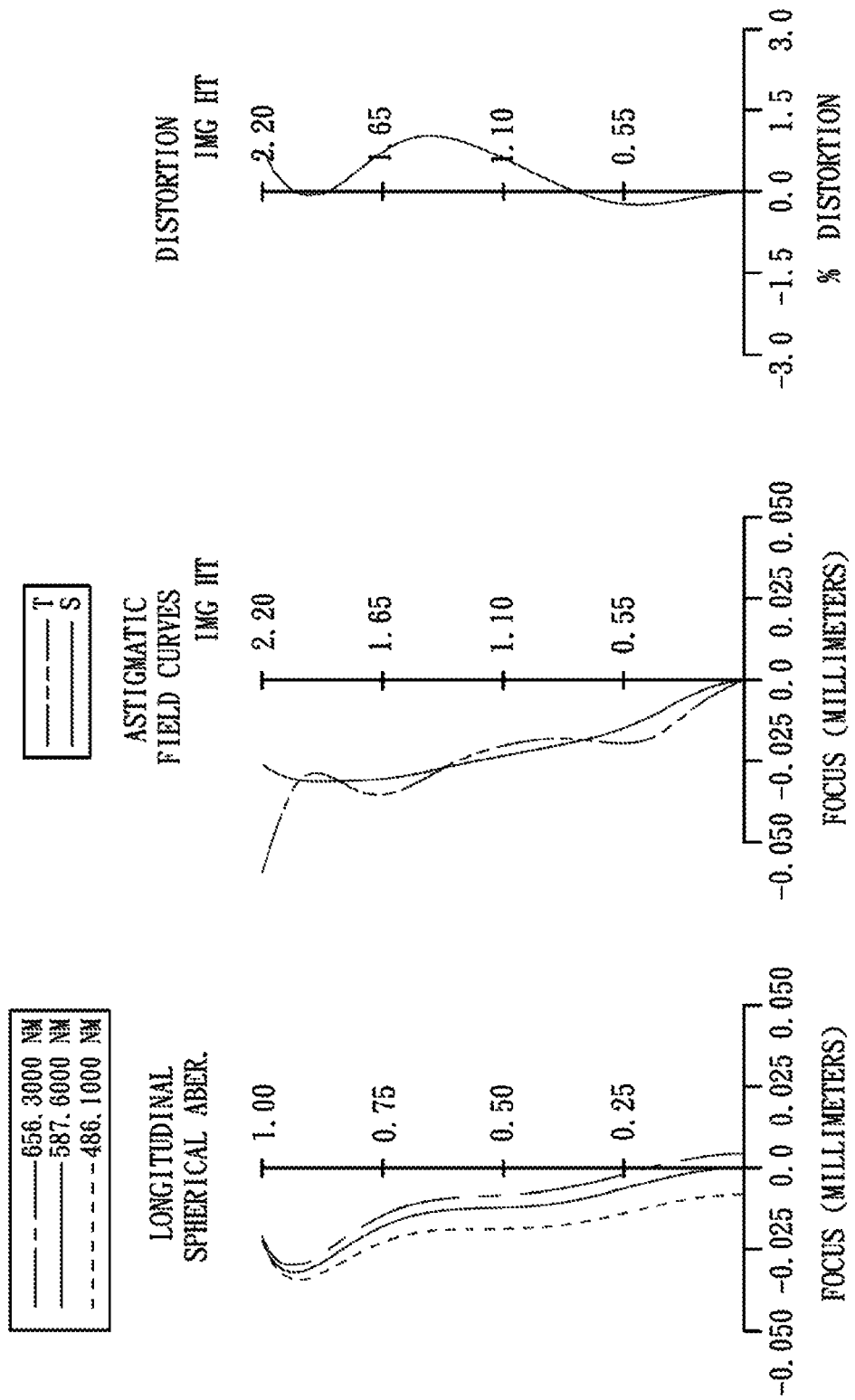
FIG. 16 shows spherical aberration curves, astigmatic field curves and a distortion curve of the image capturing optical lens assembly according to the 8th Embodiment.

FIG. 15 is a schematic view of an image capturing optical lens assembly according to the 8th embodiment of the present disclosure. FIG. 16 shows spherical aberration curves, astigmatic field curves and a distortion curve of the image capturing optical lens assembly according to the 8th embodiment. FIG. 15, the image capturing optical lens assembly includes, in order from an object side to an image side, the first lens element 810, an aperture stop 800, the second lens element 820, the third lens element 830, the fourth lens element 840, the fifth lens element 850, an IR-cut filter 880, an image plane 860 and an image sensor 870.

The first lens element 810 with positive refractive power has a convex object-side surface 811 and a convex image-side surface 812. It is made of plastic material with the object-side surface 811 and the image-side surface 812 being aspheric.

The second lens element 820 with negative refractive power has a convex object-side surface 821 and a concave image-side surface 822. It is made of plastic material with the object-side surface 321 and the image-side surface 822 being aspheric.

The third lens element 830 with positive refractive power has a concave object-side surface 831 and a convex image-side surface 832. It is made of plastic material with the object-side surface 831 and the image-side surface 832 being aspheric.

The fourth lens element 840 with positive refractive power has a concave object-side surface 841 and a convex image-side surface 842. It is made of plastic material with the object-side surface 841 and the image-side surface 842 being aspheric.

The fifth lens element 850 with negative refractive power has a convex object-side surface 851 and a concave image-side surface 852. It is made of plastic material with the object-side surface 851 and the image-side surface 852 being aspheric. Furthermore, the fifth lens element 850 has inflection points formed on the object-side surface 851 and the image-side surface 852 thereof.

The IR-cut filter 880 is made of glass material, wherein the IR-cut filter 880 is located between the fifth lens element 850 and the image plane 860, and will not affect the focal length of the image capturing optical lens assembly. The detailed optical data of the 8th embodiment are shown in Table 15 and the aspheric surface data are shown in Table 16 below.

TABLE 15

8th Embodiment
f = 2.83 mm, Fno = 2.52, HFOV = 37.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.653040 (ASP) | 0.396 | Plastic | 1.544 | 55.9 | 2.48 |
| 2 | | −6.772100 (ASP) | −0.013 | | | | |
| 3 | Ape. Stop | Plano | 0.109 | | | | |
| 4 | Lens 2 | 4.554800 (ASP) | 0.250 | Plastic | 1.640 | 23.3 | −3.62 |
| 5 | | 1.501530 (ASP) | 0.161 | | | | |
| 6 | Lens 3 | −17.543900 (ASP) | 0.408 | Plastic | 1.535 | 56.3 | 2.78 |
| 7 | | −1.383180 (ASP) | 0.261 | | | | |
| 8 | Lens 4 | −0.777850 (ASP) | 0.324 | Plastic | 1.535 | 56.3 | 9.04 |
| 9 | | −0.767230 (ASP) | 0.272 | | | | |
| 10 | Lens 5 | 3.342400 (ASP) | 0.531 | Plastic | 1.535 | 56.3 | −2.71 |
| 11 | | 0.954760 (ASP) | 0.450 | | | | |
| 12 | IR-cut filter | Plano | 0.200 | Glass | 1.517 | 64.2 | — |
| 13 | | Plano | 0.249 | | | | |
| 14 | Image | Plano | — | | | | |

Note:
Reference wavelength (d-line) is 587.6 nm.

TABLE 16

Aspheric Coefficients

| | Surface # | | | | |
|---|---|---|---|---|---|
| | 1 | 2 | 4 | 5 | 6 |
| k = | −9.50675E−02 | −1.00000E+00 | 3.00000E+00 | −1.18964E+01 | −1.00000E+00 |
| A4 = | −2.36154E−02 | −1.56969E−01 | −4.413190E−01 | −4.15652E−02 | −2.59277E−01 |
| A6 = | −1.95897E−01 | 5.16697E−01 | 1.23310E+00 | 3.78758E−01 | 1.66107E−01 |
| A8 = | 5.32647E−01 | −1.63173E+00 | −3.17359E+00 | −1.24774E+00 | 1.33968E+00 |
| A10 = | −9.02546E−01 | 7.07325E−01 | 2.19894E−01 | 2.73781E−01 | −5.36153E−01 |
| A12 = | −4.63998E−01 | −8.93676E−01 | 4.61646E+00 | −3.14558E−01 | −1.57154E+00 |
| A14 = | −2.98896E−01 | 3.27606E+00 | −2.79307E+00 | 2.50121E+00 | 2.75117E+00 |
| A16 = | | | | | −1.52324E+00 |

| | Surface # | | | | |
|---|---|---|---|---|---|
| | 7 | 8 | 9 | 10 | 11 |
| k = | 1.03421E+00 | −2.45094E+00 | −8.92107E−01 | −2.00000E+01 | −6.47853E+00 |
| A4 = | 1.39113E−03 | 3.12296E−01 | 6.10495E−01 | −2.50576E−01 | −1.29471E−01 |
| A6 = | 4.80047E−02 | −5.79806E−01 | −3.94740E−01 | 1.09500E−01 | 6.28754E−02 |
| A8 = | 2.14466E−01 | 1.42047E+00 | 1.44164E−01 | −4.74917E−02 | −2.73700E−02 |
| A10 = | 1.36946E+00 | −1.41770E+00 | 2.27544E−01 | 9.82261E−03 | 6.53944E−03 |
| A12 = | −3.98031E−01 | 2.99715E−01 | −1.22175E−01 | 7.25932E−03 | −1.05267E−03 |
| A14 = | 1.63765E−01 | 4.99523E−01 | −1.38974E−01 | −2.03142E−04 | 1.06963E−04 |
| A16 = | | −4.20386E−01 | 7.05271E−02 | −1.29984E−03 | |

In the image capturing optical lens assembly according to the 8th embodiment, the definitions of f, Fno, HFOV, V1, V2, V4, V5, CT2, CT3, CT4, CT5, T12, T23, T34, R4, R6, R7, R8, f1, f3, f4, TTL and ImgH are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 2.83 | T23/T34 | 0.62 |
| Fno | 2.52 | R4/f | 0.53 |
| HFOV (deg.) | 37.8 | R6/f | −0.49 |
| V1 − V2 | 32.6 | (R7 − R8)/(R7 + R8) | 0.01 |
| V5 − V4 | 0.0 | (f/f3) − (f/f1) | −0.12 |
| CT4/CT5 | 0.61 | f/f3 | 1.02 |
| CT5/(CT2 + CT3 + CT4) | 0.54 | f/f4 | 0.31 |
| T12/T34 | 0.37 | TTL/ImgH | 1.61 |
| T23/CT5 | 0.30 | | |

9th Embodiment

Figure 17:
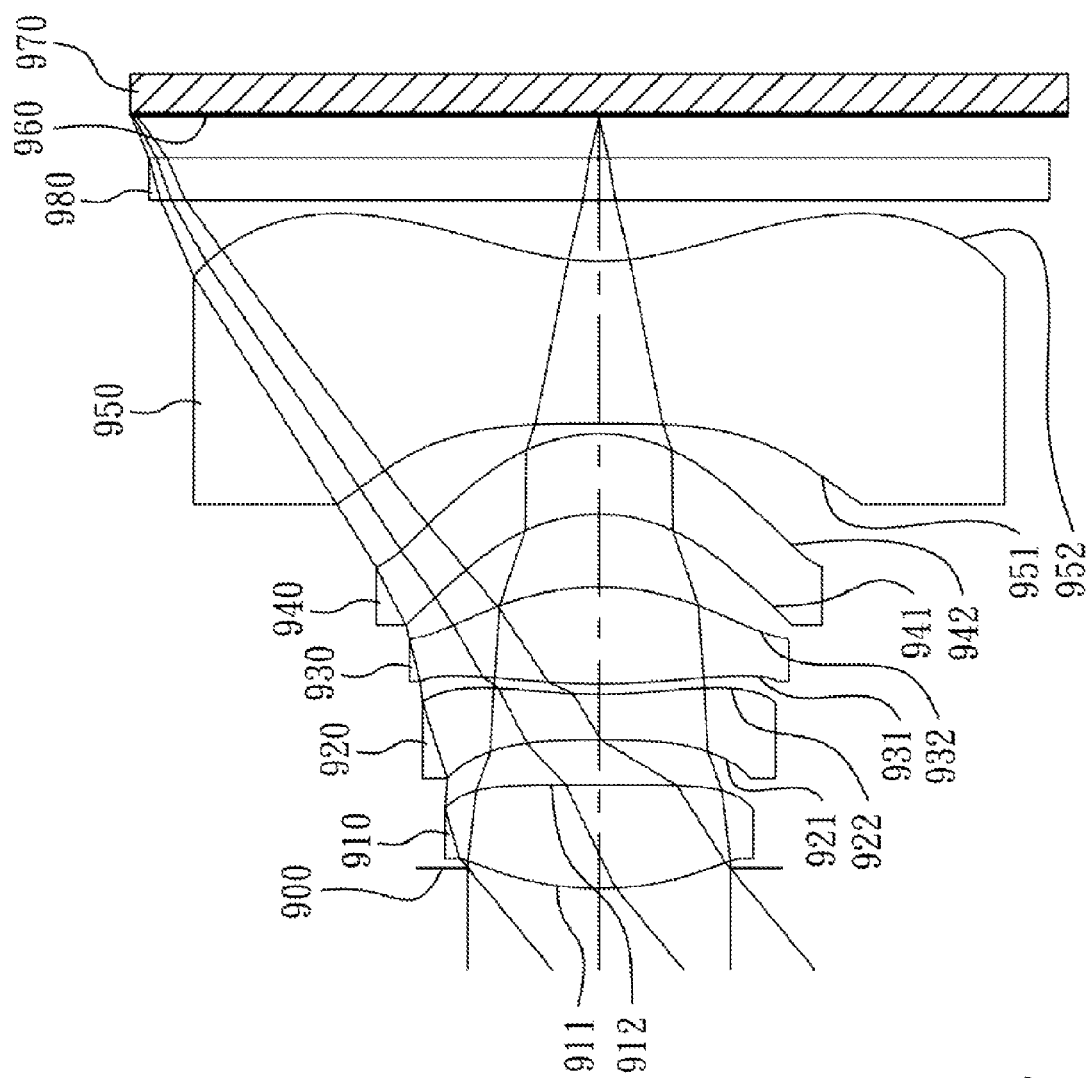
FIG. 17 is a schematic view of an image capturing optical lens assembly according to the 9th embodiment of the present disclosure.
Figure 18:
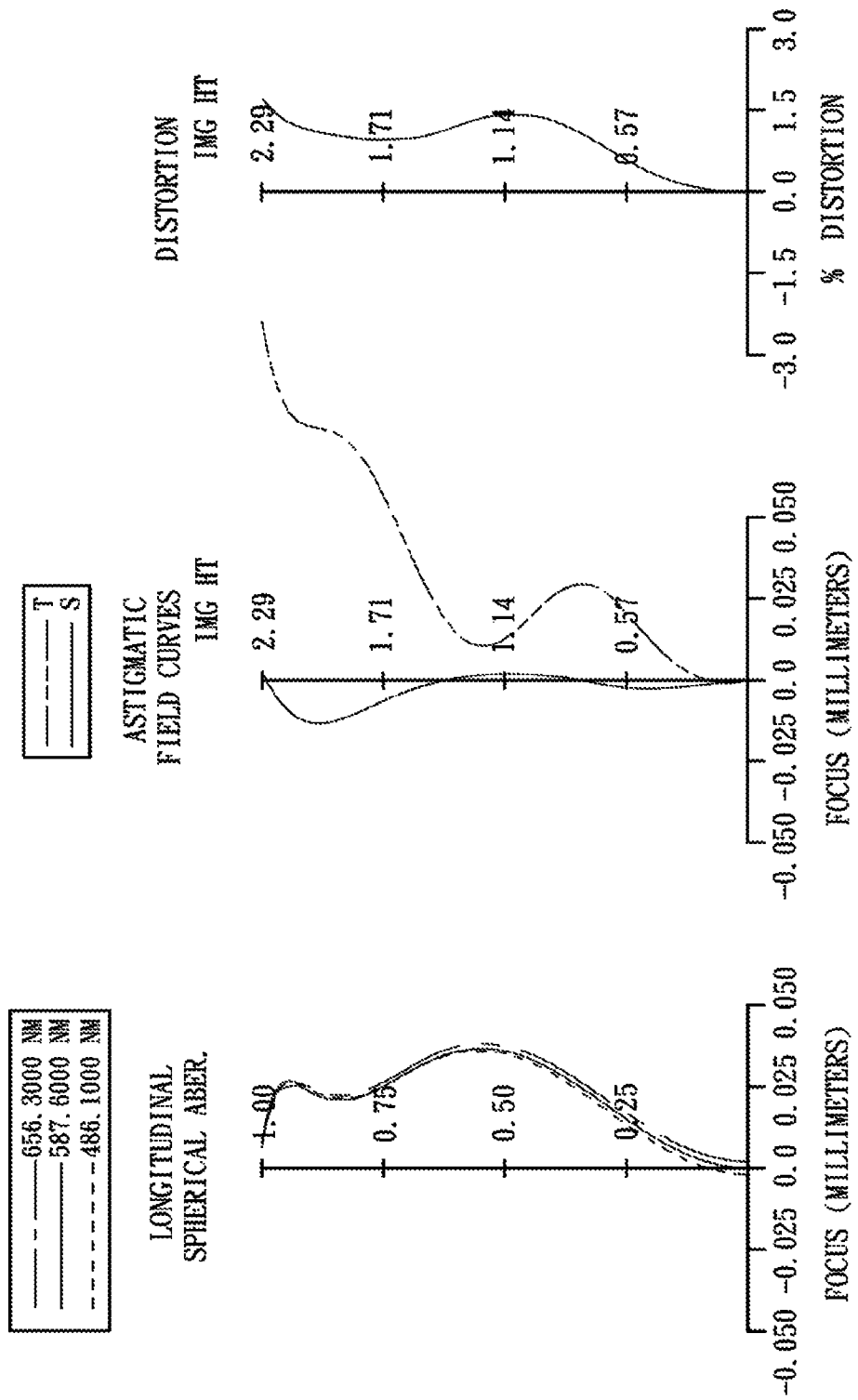
FIG. 18 shows spherical aberration curves, astigmatic field curves and a distortion curve of the image capturing optical lens assembly according to the 9th Embodiment.

FIG. 17 is a schematic view of an image capturing optical lens assembly according to the 9th embodiment of the present disclosure. FIG. 18 shows spherical aberration curves, astigmatic field curves and a distortion curve of the image capturing optical lens assembly according to the 9th embodiment. FIG. 17, the image capturing optical lens assembly includes, in order from an object side to an image side, an aperture stop 900, the first lens element 910, the second lens element 920, the third lens element 930, the fourth lens element 940, the fifth lens element 950, an IR-cut filter 980, an mage plane 960 and an image sensor 970.

The first lens element 910 with positive refractive power has a convex object-side surface 911 and a concave image-side surface 912. It is made of plastic material with the object-side surface 911 and the image-side surface 912 being aspheric.

The second lens element 920 with negative refractive power has a concave object-side surface 921 and a concave image-side surface 922. It is made of plastic material with the object-side surface 921 and the image-side surface 922 being aspheric.

The third lens element 930 with positive refractive power has a convex object-side surface 931 and a convex image-side surface 932. It is made of plastic material with the object-side surface 931 and the image-side surface 932 being aspheric.

The fourth lens element 940 with positive refractive power has a concave object-side surface 941 and a convex image-side surface 942. It is made of plastic material with the object-side surface 941 and the image-side surface 942 being aspheric.

The fifth lens element 950 with negative refractive power has a concave object-side surface 951 and a concave image-side surface 952. It is made of plastic material with the object-side surface 951 and the image-side surface 952 being aspheric. Furthermore, the fifth lens element 950 has inflection points formed on the object-side surface 951 and the image-side surface 952 thereof.

The IR-cut filter 980 is made of glass material, wherein the IR-cut filter 980 is located between the fifth lens element 950 and the image plane 960, and will not affect the focal length of the image capturing optical lens assembly.

The detailed optical data of the 9th embodiment are shown in Table 17 and the aspheric surface data are shown in Table 18 below.

TABLE 17

9th Embodiment
f = 2.70 mm, Fno = 2.10, HFOV = 39.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.101 | | | | |
| 2 | Lens 1 | 1.451950 (ASP) | 0.506 | Plastic | 1.535 | 56.3 | 2.80 |
| 3 | | 44.014600 (ASP) | 0.224 | | | | |
| 4 | Lens 2 | −8.457200 (ASP) | 0.220 | Plastic | 1.634 | 23.8 | −2.78 |
| 5 | | 2.249260 (ASP) | 0.052 | | | | |
| 6 | Lens 3 | 3.359000 (ASP) | 0.475 | Plastic | 1.530 | 55.8 | 1.88 |
| 7 | | −1.348670 (ASP) | 0.356 | | | | |
| 8 | Lens 4 | −0.839920 (ASP) | 0.395 | Plastic | 1.614 | 25.6 | 5.04 |
| 9 | | −0.778940 (ASP) | 0.049 | | | | |
| 10 | Lens 5 | −18.691600 (ASP) | 0.795 | Plastic | 1.530 | 55.8 | −2.09 |
| 11 | | 1.192030 (ASP) | 0.300 | | | | |
| 12 | IR-cut filter | Plano | 0.210 | Glass | 1.517 | 64.2 | — |
| 13 | | Plano | 0.208 | | | | |
| 14 | Image | Plano | — | | | | |

Note:
Reference wavelength (d-line) is 587.6 nm.

TABLE 18

Aspheric Coefficients

| | Surface # | | | | |
|---|---|---|---|---|---|
| | 2 | 3 | 4 | 5 | 6 |
| k = | −1.73756E−01 | −9.00000E+01 | −2.63103E+00 | −1.82068E+01 | 1.15179E+01 |
| A4 = | −3.16663E−02 | −1.41891E−01 | −6.23645E−01 | −3.43763E−01 | −1.66933E−01 |
| A6 = | 3.00455E−03 | −3.03651E−01 | 7.16818E−01 | 4.03655E−01 | −2.08559E−01 |

TABLE 18-continued

Aspheric Coefficients

| | | | | |
|---|---|---|---|---|
| A8 = | −8.63934E−02 | 4.83118E−01 | −1.15318E+00 | −4.34610E−01 | 5.28194E−01 |
| A10 = | 1.43901E−01 | −1.10820E+00 | 4.09945E−01 | 4.10940E−02 | −1.65333E−01 |
| A12 = | −1.10184E+00 | −3.28611E−02 | −1.16409E−01 | −4.60316E−02 | −1.71689E+00 |
| A14 = | 8.55186E−02 | −1.22676E−01 | 7.84950E−02 | 3.67944E−02 | 2.95720E+00 |
| A16 = | | | | | −1.77434E+00 |

| | Surface # | | | | |
|---|---|---|---|---|---|
| | 7 | 8 | 9 | 10 | 11 |
| k = | 4.48898E−01 | −6.84863E−01 | −5.70639E−01 | −2.00000E+01 | −5.59886E+00 |
| A4 = | 4.54087E−02 | −7.75668E−02 | 1.05188E−01 | −2.39529E−01 | −9.54901E−02 |
| A6 = | −1.75617E−02 | −2.23908E−01 | −1.06409E−02 | 1.03740E−01 | 4.41261E−02 |
| A8 = | 5.03578E−02 | 1.19649E+00 | 8.82313E−02 | −4.96521E−02 | −2.07573E−02 |
| A10 = | 6.90734E−01 | −1.32342E+00 | 1.11069E−01 | 1.21381E−02 | 5.93182E−03 |
| A12 = | −5.50528E−01 | 5.07192E−01 | −6.00196E−02 | 5.31833E−03 | −9.41511E−04 |
| A14 = | 1.15650E−03 | 3.95168E−01 | −4.71622E−02 | −4.75049E−04 | 6.12254E−05 |
| A16 = | | −4.07617E−01 | 4.88474E−02 | −6.22991E−04 | |

In the image capturing optical lens assembly according to the 9th embodiment, the definitions of f, Fno, HFOV, V1, V2, V4, V5, CT2, CT3, CT4, CT5, T12, T23, T34, R4, R6, R7, R8, f1, f3, f4, TTL and ImgH are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 2.70 | T23/T34 | 0.15 |
| Fno | 2.10 | R4/f | 0.83 |
| HFOV (deg.) | 39.6 | R6/f | −0.50 |
| V1 − V2 | 32.5 | (R7 − R8)/(R7 + R8) | 0.04 |
| V5 − V4 | 30.2 | (f/f3) − (f/f1) | 0.47 |
| CT4/CT5 | 0.50 | f/f3 | 1.43 |
| CT5/(CT2 + CT3 + CT4) | 0.73 | f/f4 | 0.54 |
| T12/T34 | 0.63 | TTL/ImgH | 1.63 |
| T23/CT5 | 0.07 | | |

10th Embodiment

Figure 19:
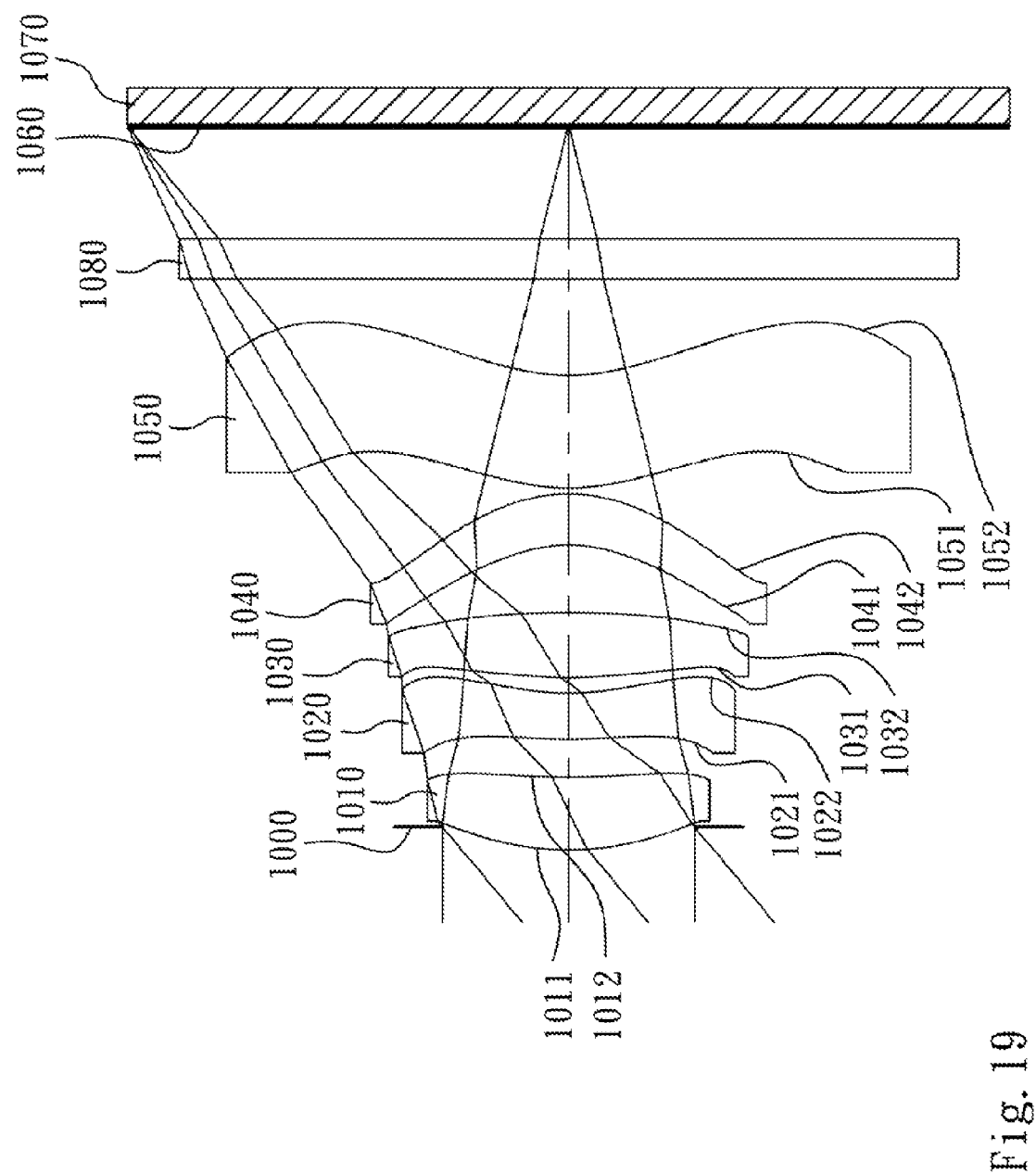
FIG. 19 is a schematic view of an image capturing optical lens assembly according to the 10th embodiment of the present disclosure.
Figure 20:
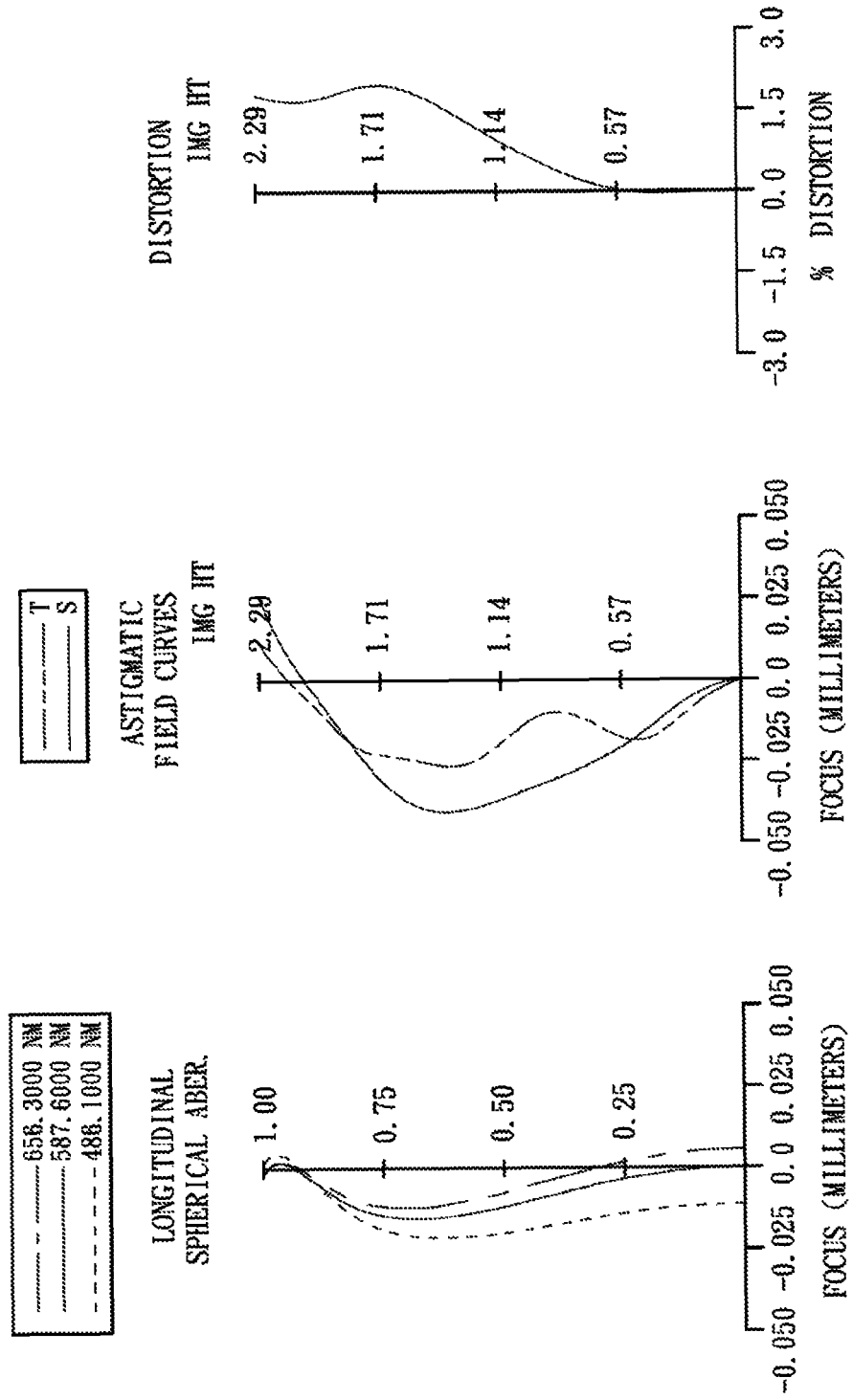
FIG. 20 shows spherical aberration curves, astigmatic field curves and a distortion curve of the image capturing optical lens assembly according to the 10th Embodiment.

FIG. 19 is a schematic view of an image capturing optical lens assembly according to the 10th embodiment of the present disclosure. FIG. 20 shows spherical aberration curves, astigmatic field curves and a distortion curve of the image capturing optical lens assembly according to the 10th embodiment. FIG. 19, the image capturing optical lens assembly includes, in order from an object side to an image side, an aperture stop 1000, the first lens element 1010, the second lens element 1020, the third lens element 1030, the fourth lens element 1040, the fifth lens element 1050, an IR-cut filter 1080, an image plane 1060 and an image sensor 1070.

The first lens element 1010 with positive refractive power has a convex object-side surface 1011 and a concave image-side surface 1012. It is made of plastic material with the object-side surface 1011 and the image-side surface 1012 being aspheric.

The second lens element 1020 with negative refractive power has a convex object-side surface 1021 and a concave image-side surface 1022. It is made of plastic material with the object-side surface 1021 and the image-side surface 1022 being aspheric.

The third lens element 1030 with positive refractive power has a convex object-side surface 1031 and a convex image-side surface 1032. It is made of plastic material with the object-side surface 1031 and the image-side surface 1032 being aspheric.

The fourth lens element 1040 with positive refractive power has a concave object-side surface 1041 and a convex image-side surface 1042. It is made of plastic material with the object-side surface 1041 and the image-side surface 1042 being aspheric.

The fifth lens element 1050 with positive refractive power has a convex object-side surface 1051 and a concave image-side surface 1052. It is made of plastic material with the object-side surface 1051 and the image-side surface 1052 being aspheric. Furthermore, the fifth lens element 1050 has inflection points formed on the object-side surface 1051 and the image-side surface 1052 thereof.

The IR-cut filter 1080 is made of glass material, wherein the IR-cut filter 1080 is located between the fifth lens element 1050 and the image plane 1060, and will not affect the focal length of the image capturing optical lens assembly.

The detailed optical data of the 10th embodiment are shown in Table 19 and the aspheric surface data are shown in Table 20 below

TABLE 19

10th Embodiment
f = 2.72 mm, Fno = 2.07, HFOV = 39.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.119 | | | | |
| 2 | Lens 1 | 1.521110 (ASP) | 0.375 | Plastic | 1.544 | 55.9 | 4.37 |
| 3 | | 3.852700 (ASP) | 0.198 | | | | |
| 4 | Lens 2 | 2.779510 (ASP) | 0.240 | Plastic | 1.640 | 23.3 | −4.16 |

TABLE 19-continued

10th Embodiment
f = 2.72 mm, Fno = 2.07, HFOV = 39.7 deg.

| Surface # | | Curvature Radius | Thickness | Material | Index | Abbe # | Focal length |
|---|---|---|---|---|---|---|---|
| 5 | | 1.313820 (ASP) | 0.081 | | | | |
| 6 | Lens 3 | 2.487890 (ASP) | 0.340 | Plastic | 1.544 | 55.9 | 3.27 |
| 7 | | −5.931900 (ASP) | 0.350 | | | | |
| 8 | Lens 4 | −0.711790 (ASP) | 0.269 | Plastic | 1.535 | 56.3 | 29.78 |
| 9 | | −0.771030 (ASP) | 0.030 | | | | |
| 10 | Lens 5 | 1.099390 (ASP) | 0.586 | Plastic | 1.544 | 55.9 | 15.15 |
| 11 | | 1.030290 (ASP) | 0.500 | | | | |
| 12 | IR-cut filter | Plano | 0.210 | Glass | 1.517 | 64.2 | — |
| 13 | | Plano | 0.585 | | | | |
| 14 | Image | Plano | — | | | | |

Note:
Reference wavelength (d-line) is 587.6 nm.

TABLE 20

Aspheric Coefficients

| | Surface # | | | | |
|---|---|---|---|---|---|
| | 2 | 3 | 4 | 5 | 6 |
| k = | −2.90300E−01 | −9.17947E+00 | −1.90758E+01 | −1.09932E+01 | −2.96123E+01 |
| A4 = | −1.24445E−02 | −1.79935E−01 | −5.35327E−01 | −2.38148E−01 | −1.27335E−01 |
| A6 = | 4.02539E−02 | 1.26443E−01 | 7.22044E−01 | 4.03886E−01 | 6.52220E−02 |
| A8 = | −2.70521E−01 | −5.28797E−01 | −1.73070E+00 | −5.69352E−01 | 5.21279E−01 |
| A10 = | 4.87690E−01 | 2.38249E−02 | 1.23283E+00 | −8.76667E−03 | −5.41786E−01 |
| A12 = | −8.74860E−01 | −5.20547E−01 | −2.30840E−01 | −4.27369E−02 | −1.73783E+00 |
| A14 = | 8.49751E−02 | −1.19160E−01 | 7.98105E−02 | 3.41378E−04 | 3.03029E+00 |
| A16 = | | | | | −1.79891E+00 |

| | Surface # | | | | |
|---|---|---|---|---|---|
| | 7 | 8 | 9 | 10 | 11 |
| k = | −7.96012E+00 | −3.93249E+00 | −7.19803E−01 | −5.24520E+00 | −5.25486E+00 |
| A4 = | −9.56116E−02 | 8.19730E−02 | 3.85786E−01 | −1.45379E−01 | −7.10028E−02 |
| A6 = | −7.49955E−02 | −7.68706E−01 | −3.46785E−01 | 9.23421E−02 | 2.75651E−02 |
| A8 = | 4.14358E−02 | 1.39921E+00 | 1.60241E−01 | −6.52608E−02 | −1.85563E−02 |
| A10 = | 5.92591E−01 | −1.06005E+00 | 2.32498E−01 | 9.03903E−03 | 5.98868E−03 |
| A12 = | −5.43398E−01 | 1.94314E−01 | −1.10209E−01 | 5.31922E−03 | −9.74003E−04 |
| A14 = | −4.38188E−02 | 4.13561E−01 | −1.53509E−01 | −4.98511E−04 | 6.75367E−05 |
| A16 = | | −3.49791E−01 | 1.20701E−01 | −2.40622E−04 | |

In the image capturing optical lens assembly according to the 10th embodiment, the definitions of f, Fno, HFOV, V1, V2, V4, V5, CT2, CT3, CT4, CT5, T12, T23, T34, R4, R6, R7, R8, f1, f3, f4, TTL and ImgH are the same as those stated in the 1st embodiment with corresponding values for the 10th embodiment. Moreover, these parameters can be calculated from Table 19 and Table 20 as the following values and satisfy the following relationships:

| f (mm) | 2.72 | T23/T34 | 0.23 |
|---|---|---|---|
| Fno | 2.07 | R4/f | 0.48 |
| HFOV (deg.) | 39.7 | R6/f | −2.18 |
| V1 − V2 | 32.6 | (R7 − R8)/(R7 + R8) | −0.04 |
| V5 − V4 | −0.4 | (f/f3) − (f/f1) | 0.21 |
| CT4/CT5 | 0.46 | f/f3 | 0.83 |
| CT5/(CT2 + CT3 + CT4) | 0.69 | f/f4 | 0.09 |
| T12/T34 | 0.57 | TTL/ImgH | 1.62 |
| T23/CT5 | 0.14 | | |

It will be apparent to those skilled in the art that various modifications and to variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image capturing optical lens assembly comprising, in order from an object side to an image side:
    a first lens element with positive refractive power having a convex object-side surface;
    a second lens element with negative refractive power having a concave image-side surface;
    a third lens element with positive refractive power having a convex image-side surface, wherein an object-side surface and the image-side surface of the third lens element are aspheric;
    a fourth lens element with positive refractive power, wherein an object-side surface and an image-side surface of the fourth lens element are aspheric; and
    fifth lens element with refractive power made of plastic material and having a concave image-side surface, wherein an object-side surface and the image-side surface of the fifth lens element are aspheric, and the fifth lens element has at least one inflection point formed on at least one of the object-side surface and the image-side surface thereof;

wherein a focal length of the image capturing optical lens assembly is f, a focal length of the first lens element is f1, a focal length of the third lens element is f3, a curvature radius of the image-side surface of the second lens element is R4, a curvature radius of the image-side surface of the third lens element is R6, an axial distance between the second lens element and the third lens element is T23, a central thickness of the fifth lens element is CT5, and the following relationships are satisfied:

$0<(f/f3)-(f/f1)<0.85$;

$0<R4/f<3.0$;

$-4.5<R6/f<0$; and $0<T23/CT5<0.70$.

2. The image capturing optical lens assembly of claim 1, wherein the fourth lens element has a concave object-side surface and a convex image-side surface.

3. The image capturing optical lens assembly of claim 2, wherein the focal length of the image capturing optical lens assembly is f, a focal length of the fourth lens element is f4, and the following relationship is satisfied:

$0<f/f4<0.90$.

4. The image capturing optical lens assembly of claim 2, wherein the focal length of the image capturing optical lens assembly is f, the focal length of the third lens element is f3, and the following relationship is satisfied:

$0.7<f/f3<1.7$.

5. The image capturing optical lens assembly of claim 2, wherein a central thickness of the second lens element is CT2, a central thickness of the third lens element is CT3, a central thickness of the fourth lens element is CT4, the central thickness of the fifth lens element is CT5, and the following relationship is satisfied:

$0.5<CT5/(CT2+CT3+CT4)<1.5$.

6. The image capturing optical lens assembly of claim 2, wherein an Abbe number of the fourth lens element is V4, an Abbe number of the fifth lens element is V5, and the following relationship is satisfied:

$10<V5-V4<45$.

7. The image capturing optical lens assembly of claim 4, wherein an Abbe number of the first lens element is V1 an Abbe number of the second lens element is V2, and the following relationship is satisfied:

$28<V1-V2<50$.

8. The image capturing optical lens assembly of claim 4, wherein the focal length of the image capturing optical lens assembly is f, the curvature radius of the image-side surface of the second lens element is R4, and the following relationship is satisfied:

$0<R4/f<1.0$.

9. The image capturing optical lens assembly of claim 4, wherein a curvature radius of the object-side surface of the fourth lens element is R7, a curvature radius of the image-side surface of the fourth lens element is R8, and the following relationship is satisfied:

$-0.2<(R7-R8)/(R7+R8)<0.2$.

10. The image capturing optical lens assembly of claim 4, wherein the central thickness of the fourth lens element is CT4, the central thickness of the fifth lens element is CT5, and the following relationship is satisfied:

$0.25<CT4/CT5<0.7$.

11. The image capturing optical lens assembly of claim 2, wherein the fifth lens element with negative refractive power has a convex object-side surface.

12. The image capturing optical lens assembly of claim 11, wherein the focal length of the image capturing optical lens assembly is f, the curvature radius of the image-side surface of the third lens element is R6, and the following relationship is satisfied:

$-1.0<R6/f<0$.

13. The image capturing optical lens assembly of claim 12, wherein a maximum image height of the image capturing optical lens assembly is 1 mg an axial distance between the object-side surface of the first lens element and an image plane is TTL, and the following relationship is satisfied:

$TTL/\mathrm{Img}H<1.8$.

14. The image capturing optical lens assembly of claim 3, wherein an axial distance between the first lens element and the second lens element is T12, an axial distance between the third lens element and the fourth lens element is T34, and the following relationship is satisfied:

$0.1<T12/T34<0.7$.

15. An image capturing optical lens assembly comprising, in order from an object side to an image side:
   a first lens element with positive refractive power having a convex object-side surface;
   a second lens element with negative refractive power having a concave image-side surface;
   a third lens element with positive refractive power, wherein an object-side surface and an image-side surface of the third lens element are aspheric;
   a fourth lens element with positive refractive power, wherein an object-side surface and an image-side surface of the fourth lens element are aspheric; and
   fifth lens element with refractive power made of plastic material and having a concave image-side surface, wherein an object-side surface and the image-side surface of the fifth lens element are aspheric, and the fifth lens element has at least one inflection point formed on at least one of the object-side surface and the image-side surface thereof;
   wherein a focal length of the image capturing optical lens assembly is f, a focal length of the first lens element is f1, a focal length of the third lens element is f3, a focal length of the fourth lens element is f4, a curvature radius of the image-side surface of the second lens element is R4, an axial distance between the second lens element and the third lens element is T23, a central thickness of the fifth lens element is CT5, and the following relationships are satisfied:

$-0.25<(f/f3)-(f/f1)<1.0$;

$0<R4/f<3.0$;

$0<T23/CT5<0.70$; and $0<f/f4<0.90$.

16. The image capturing optical lens assembly of claim 15, wherein the fourth lens element has a concave object-side surface and a convex image-side surface.

17. The image capturing optical lens assembly of claim 16, wherein the focal length of the image capturing optical lens assembly is f, a curvature radius of the image-side surface of the third lens element is R6, and the following relationship is satisfied:

$-1.0 < R6/f < 0.$

18. The image capturing optical lens assembly of claim 16, wherein the fifth lens element with negative refractive power has a convex object-side surface.

19. The image capturing optical lens assembly of claim 16, wherein the focal length of the image capturing optical lens assembly is f, the focal length of the third lens element is f3, and the following relationship is satisfied:

$0.7 < f/f3 < 1.7.$

20. The image capturing optical lens assembly of claim 16, wherein the axial distance between the second lens element and the third lens element is T23, an axial distance between the third lens element and the fourth lens element is T34, and the following relationship is satisfied:

$0 < T23/T34 < 1.0.$

21. The image capturing optical lens assembly of claim 16, wherein a central thickness of the fourth lens element is CT4, the central thickness of the fifth lens element is CT5, and the following relationship is satisfied:

$0.25 < CT4/CT5 < 0.7.$

22. The image capturing optical lens assembly of claim 15, wherein a maximum image height of the image capturing optical lens assembly is ImgH, an axial distance between the object-side surface of the first lens element and an image plane is TTL, and the following relationship is satisfied:

$TTL/ImgH < 1.8.$

23. The image capturing optical lens assembly of claim 15, wherein the focal length of the image capturing optical lens assembly is f, the focal length of the fourth lens element is f4, and the following relationship is satisfied:

$0 < f/f4 < 0.45.$

24. An image capturing optical lens assembly comprising, in order from an object side to an image side, a first lens element with positive refractive power having a convex object-side surface;

a second lens element with negative refractive power having a concave image-side surface;

a third lens element with positive refractive power having a convex image-side surface, wherein an object-side surface and the image-side surface of the third lens element are aspheric;

a fourth lens element with positive refractive power having a concave object-side surface and a convex image-side surface, wherein the object-side surface and the image-side surface of the fourth lens element are aspheric; and a fifth lens element with refractive power made of plastic material and having a concave image-side surface, wherein an object-side surface and the image-side surface of the fifth lens element are aspheric, and the fifth lens element has at least one inflection point formed on at least one of the object-side surface and the image-side surface thereof;

wherein a focal length of the image capturing optical lens assembly is f, a focal length of the first lens element is f1, a focal length of the third lens element is f3, a curvature radius of the image-side surface of the second lens element is R4, an axial distance between the second lens element and the third lens element is T23, an axial distance between the third lens element and the fourth lens element is T34, and the following relationships are satisfied:

$0 < (f/f3) - (f/f1) < 0.85;$ $0 < R4/f < 3.0;$ and $0 < T23/T34 < 1.0.$

25. The image capturing optical lens assembly of claim 24, wherein the focal length of the image capturing optical lens assembly is f, a focal length of the fourth lens element is f4, and the following relationship is satisfied:

$0 < f/f4 < 0.90.$

26. The image capturing optical lens assembly of claim 24, wherein the axial distance between the second lens element and the third lens element is T23, a central thickness of the fifth lens element is CT5, and the following relationship is satisfied:

$0 < T23/CT5 < 0.70.$

* * * * *

UNITED STATES PATENT AND TRADEMARK OFFICE
CERTIFICATE OF CORRECTION

PATENT NO. : 8,743,479 B2
APPLICATION NO. : 13/612858
DATED : June 3, 2014
INVENTOR(S) : Tsung-Han Tsai and Hsin-Hsuan Huang It is certified that error appears in the above-identified patent and that said Letters Patent is hereby corrected as shown below:

In the Claims:

(1) In column 34, line 64, claim 1 of the issued patent, US 8,743,479, shows a fifth lens element. However, an article "a" should be added in front of "fifth lens element". In the Appendix 1, page 48, line 14, the original claim 1 clearly shows that "a fifth lens element with refractive power...". That is, "a" is clearly stated in front of "fifth lens element".

(2) In column 36, line 19, claim 13 of the issued patent, US 8,743,479, shows "optical lens assembly is 1 mg an axial......". However, it should be corrected as "optical lens assembly is ImgH, an axial......". In the Appendix 1, page 51, line 17 to 18, the original claim 13 shows that "optical lens assembly is ImgH, an axial......".

(3) In column 36, line 44, claim 15 of the issued patent, US 8,743,479, shows a fifth lens element. However, an article "a" should be added in front of "fifth lens element". In the Appendix 1, page 52, line 14, the original claim 15 very clearly shows that "a fifth lens element with refractive power...". That is, "a" is clearly stated in front of "fifth lens element".

Signed and Sealed this
Ninth Day of September, 2014

Michelle K. Lee
*Deputy Director of the United States Patent and Trademark Office*